United States Patent
Di Girolamo et al.

(10) Patent No.: US 12,324,045 B2
(45) Date of Patent: Jun. 3, 2025

(54) RLM AND RLF PROCEDURES FOR NR V2X

(71) Applicant: IPLA HOLDINGS INC., New York, NY (US)

(72) Inventors: Rocco Di Girolamo, Laval (CA); Pascal M. Adjakple, Great Neck, NY (US); Patrick Svedman, Stockholm (SE); Qing Li, Princeton Junction, NJ (US); Zhuo Chen, Claymont, DE (US); Catalina Mihaela Mladin, Hatboro, PA (US); Allan Y. Tsai, Boonton, NJ (US); Gudong Zhang, Woodbury, NY (US)

(73) Assignee: IPLA HOLDINGS INC.

( * ) Notice: Subject to any disclaimer, the term of this patent is extended or adjusted under 35 U.S.C. 154(b) by 784 days.

(21) Appl. No.: 17/598,088

(22) PCT Filed: Mar. 27, 2020

(86) PCT No.: PCT/US2020/025215
§ 371 (c)(1),
(2) Date: Sep. 24, 2021

(87) PCT Pub. No.: WO2020/198586
PCT Pub. Date: Oct. 1, 2020

(65) Prior Publication Data
US 2022/0191962 A1 Jun. 16, 2022

Related U.S. Application Data

(60) Provisional application No. 62/824,777, filed on Mar. 27, 2019, provisional application No. 62/886,631, filed on Aug. 14, 2019.

(51) Int. Cl.
H04W 76/25 (2018.01)
H04L 1/1812 (2023.01)
(Continued)

(52) U.S. Cl.
CPC ........... *H04W 76/25* (2018.02); *H04L 1/1812* (2013.01); *H04L 5/0053* (2013.01); *H04W 24/08* (2013.01);
(Continued)

(58) Field of Classification Search
CPC ..... H04W 76/25; H04W 24/08; H04W 24/10; H04W 76/30; H04W 92/18; H04L 1/1812; H04L 5/0053
See application file for complete search history.

(56) References Cited

U.S. PATENT DOCUMENTS

| 11,483,885 | B2* | 10/2022 | Lee | H04W 76/23 |
| 2015/0045078 | A1 | 2/2015 | Lee | |
| 2024/0147561 | A1* | 5/2024 | Chen | H04W 76/18 |

FOREIGN PATENT DOCUMENTS

| JP | 2014207587 A | 10/2014 |
| JP | 2015521455 A | 7/2015 |

(Continued)

OTHER PUBLICATIONS

LG Electronics: "Study on NR V2X", 3GPP TSG RAN meeting #83, RP-190225, Mar. 11, 2019, 29 pages, Shenzhen, China, Mar. 18-21, 2019.

(Continued)

*Primary Examiner* — Rhonda L Murphy
(74) *Attorney, Agent, or Firm* — XSENSUS LLP

(57) ABSTRACT

An apparatus in accordance with the present application may monitor a sidelink (SL) connection. The apparatus includes processing circuitry that receives signals in a protocol stack to perform SL-radio link monitoring (SL-RLM), and determines, according to the signals, whether a SL-radio link failure (RLF) has occurred. The signals may include hybrid automatic repeat request (HARQ) feedback. In a case that the signals include a HARQ-NACK, the processing circuitry (Continued)

determines that the SL-RLF has occurred. The processing circuitry further receives configuration information related to the SL-RLM for the signals, the configuration information including configurations for measurement quantities of the signals and a condition for declaring SL-RLF, configures, according to the configuration information, lower layers of the protocol stack for the SL-RLM for the signals, and performs SL-RLM measurements of the measurement quantities.

11 Claims, 19 Drawing Sheets

(51) Int. Cl.
  *H04L 5/00* (2006.01)
  *H04W 24/08* (2009.01)
  *H04W 24/10* (2009.01)
  *H04W 76/30* (2018.01)
  *H04W 92/18* (2009.01)
(52) U.S. Cl.
  CPC ........... *H04W 24/10* (2013.01); *H04W 76/30* (2018.02); *H04W 92/18* (2013.01)

(56) References Cited

FOREIGN PATENT DOCUMENTS

| JP | 2017509264 A | 3/2017 |
| JP | 2018026625 A | 2/2018 |
| JP | 2018129823 A | 8/2018 |
| JP | 2018526894 A | 9/2018 |
| WO | WO-2018237400 A | 12/2018 |

OTHER PUBLICATIONS

ZTE, Sanechips , Consideration on AS level sidelink management , 3GPP TSG RAN WG2 #105 R2-1900379, Feb. 15, 2019.
Ericsson: "On NR sidelink link management for unicast", 3GPP Draft; R2-1901707-ON NR Sidelink Link Management for Unicast, 3rd Generation Partnership Project (3GPP), Mobile Competence Centre; 650, Route Des Lucioles; F-06921 Sophia-Antipolis Cedex; FR; vol. RAN WG2, No. Athens, Greece; Feb. 25, 2019-Mar. 1, 2019, Feb. 14, 2019, XP051603059.
Interdigital Inc: "RLM/RLF and RRM for NR V2X", 3GPP Draft; R2-1901579 (R16 V2X SI A11421 RLM_RLF), 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 25, 2019-Mar. 1, 2019, Feb. 15, 2019, XP051602934.

\* cited by examiner

US 12,324,045 B2

RLM AND RLF PROCEDURES FOR NR V2X

CROSS-REFERENCE TO RELATED APPLICATIONS

This application is the National Stage Application of International Patent Application No. PCT/US2020/025215, filed Mar. 27, 2020 which claims priority to U.S. Provisional Application No. 62/824,777, filed on Mar. 27, 2019, and to U.S. Provisional Application No. 62/886,631, filed on Aug. 14, 2019, the contents of each of which are incorporated by reference in their entirety.

FIELD

The present disclosure relates generally to wireless communications, and more particularly to wireless communications systems, devices, methods, and computer readable medium for remote link monitoring and remote link failure procedures for radio communication.

SUMMARY

An exemplary embodiment of the present disclosure provides an apparatus configured to monitor a sidelink (SL) connection. The apparatus comprises processing circuitry configured to receive signals in a protocol stack to perform SL-radio link monitoring (SL-RLM), and determine, according to the signals, whether a SL-radio link failure (RLF) has occurred. The signals may include hybrid automatic repeat request (HARQ) feedback.

In a case that the signals include a HARQ-NACK, the processing circuitry may determine that the SL-RLF has occurred. The processing circuitry may be further configured to transmit a signal block to another apparatus, and the signals are in response to the transmission of the signal block.

The processing circuitry may be further configured to receive configuration information related to the SL-RLM for the signals, the configuration information including configurations for measurement quantities of the signals and a condition for declaring SL-RLF, configure, according to the configuration information, lower layers of the protocol stack for the SL-RLM for the signals, and perform SL-RLM measurements of the measurement quantities. The measurement quantities may include hybrid automatic repeat request (HARQ) feedback. The measurement quantities may include radio link in-sync or out-of-sync. The measurement quantities may include a keep-alive message. The measurement quantities may include Radio Link Control (RLC) feedback.

The processing circuitry may be further configured to determine whether the SL-RLM measurements satisfy the condition, and declare that the SL-RLF has occurred in a case that the condition is satisfied. The processing circuitry may be further configured to determine whether the SL-RLM measurements satisfy the condition, and declare that the SL-RLF has not occurred in a case that the condition is not satisfied. The processing circuitry may be further configured to transmit the SL-RLM measurements of the signals to a controlling entity. The controlling entity determines, according to the SL-RLM measurements received from the apparatus, whether the SL-RLF has occurred. The processing circuitry may be further configured to receive an indication, from an upper layer, including a keep-alive failure.

Another exemplary embodiment of the present disclosure provides a method for monitoring a sidelink (SL) connection. The method comprises receiving signals in a protocol stack to perform SL-radio link monitoring (SL-RLM), and determining, according to the signals, whether a SL-radio link failure (RLF) has occurred.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
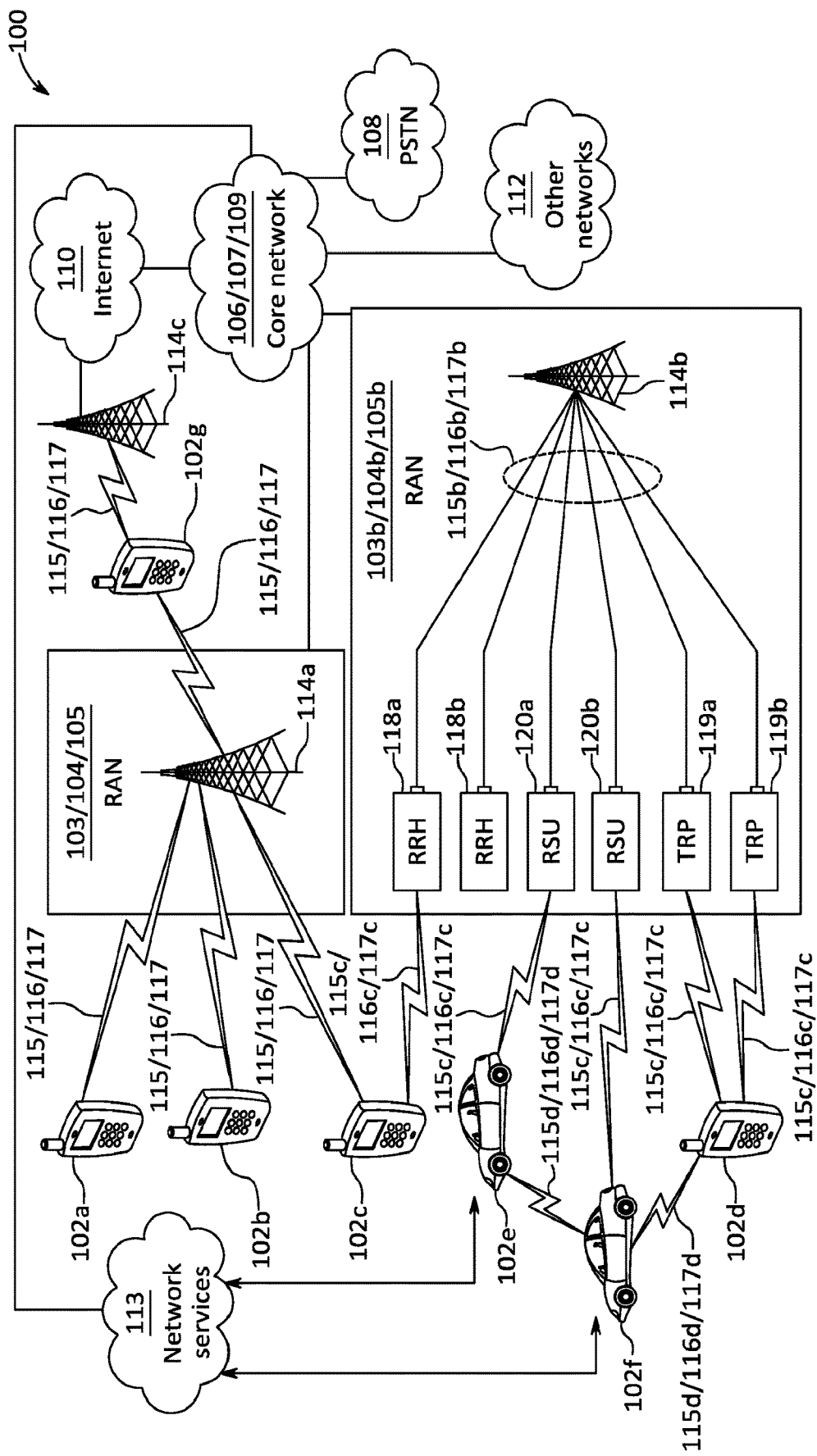
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities - including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

TABLE 1

| Abbreviations | |
|---|---|
| BLER | Block Error Rate |
| BWP | Bandwidth Part |
| C-RNTI | Cell Radio-Network Temporary Identifier |
| CQI | Channel Quality Indicator |
| CSI-RS | Channel State Information Reference Signals |
| DCI | Downlink Control Information |
| DL | Downlink |
| DL-RS | Downlink Reference Signal |
| eNB | Evolved Node B |
| gNB | NR NodeB |
| HARQ | Hybrid Automatic Repeat Request |
| IE | Information Element |
| IS | In-Sync |

TABLE 1-continued

| Abbreviations | |
|---|---|
| L1 | Layer 1 |
| L2 | Layer 2 |
| L3 | Layer 3 |
| LTE | Long Term Evolution |
| MAC | Medium Access Control |
| NR | New Radio |
| PDCCH | Physical Downlink Control Channel |
| PHY | Physical Layer |
| RAN | Radio Access Network |
| RLC | Radio Link Control |
| RLF | Radio Link Failure |
| RLM | Radio Link Monitoring |
| BLER | Block Error Rate |
| RNTI | Radio Network Temporary Identifier |
| RRC | Radio Resource Control |
| RRM | Radio Resource Management |
| RS | Reference Signal |
| RSRP | Reference Signal Received Power |
| RSRQ | Reference Signal Received Quality |
| RSSI | Received Signal Strength Indicator |
| RX | Receive |
| SCell | Secondary Cell |
| SI | System Information |
| SINR | Signal-to-Noise and Interference Ratio |
| SL | Sidelink |
| S-CQI | Sidelink CQI |
| S-RLF | Sidelink Radio Link Failure |
| S-RLM | Sidelink Radio Link Monitoring |
| S-SSB | Sidelink SSB |
| SS | Synchronization Signal |
| SSB | SS Block |
| UE | User Equipment |
| UL | Uplink |

Example Communication System and Networks

FIG. 1A illustrates an example communications system 100 in which the systems, methods, and apparatuses described and claimed herein may be used. The communications system 100 may include wireless transmit/receive units (WTRUs) 102*a*, 102*b*, 102*c*, 102*d*, 102*e*, 102*f*, and/or 102*g*, which generally or collectively may be referred to as WTRU 102 or WTRUs 102. The communications system 100 may include, a RAN 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b,TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g.; WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
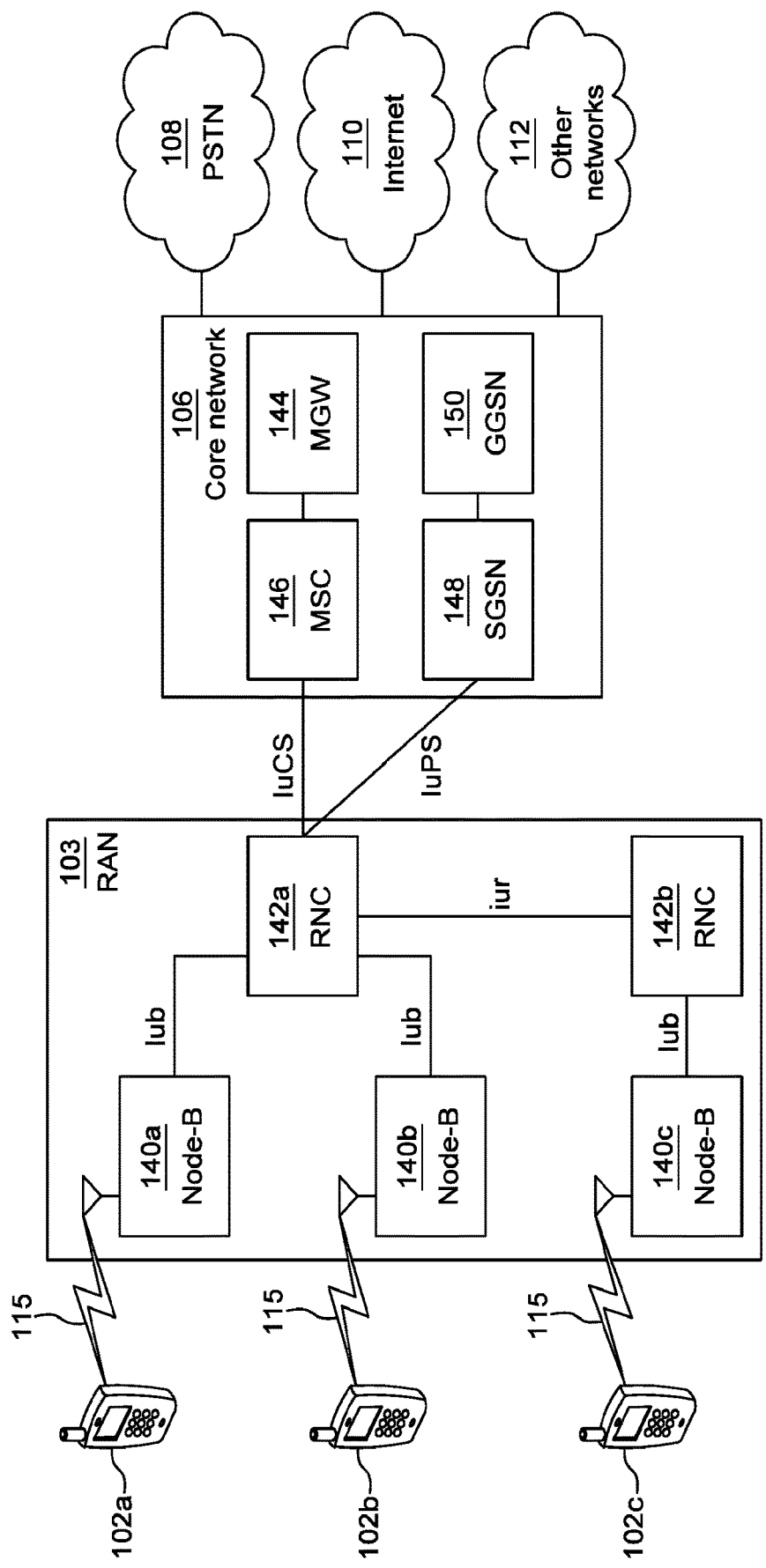
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between the WTRUs 102a, 102b, and 102c, and IP-enabled devices.

The core network 106 may also be connected to the other networks 112, which may include other wired or wireless networks that are owned and/or operated by other service providers.

Figure 1C:
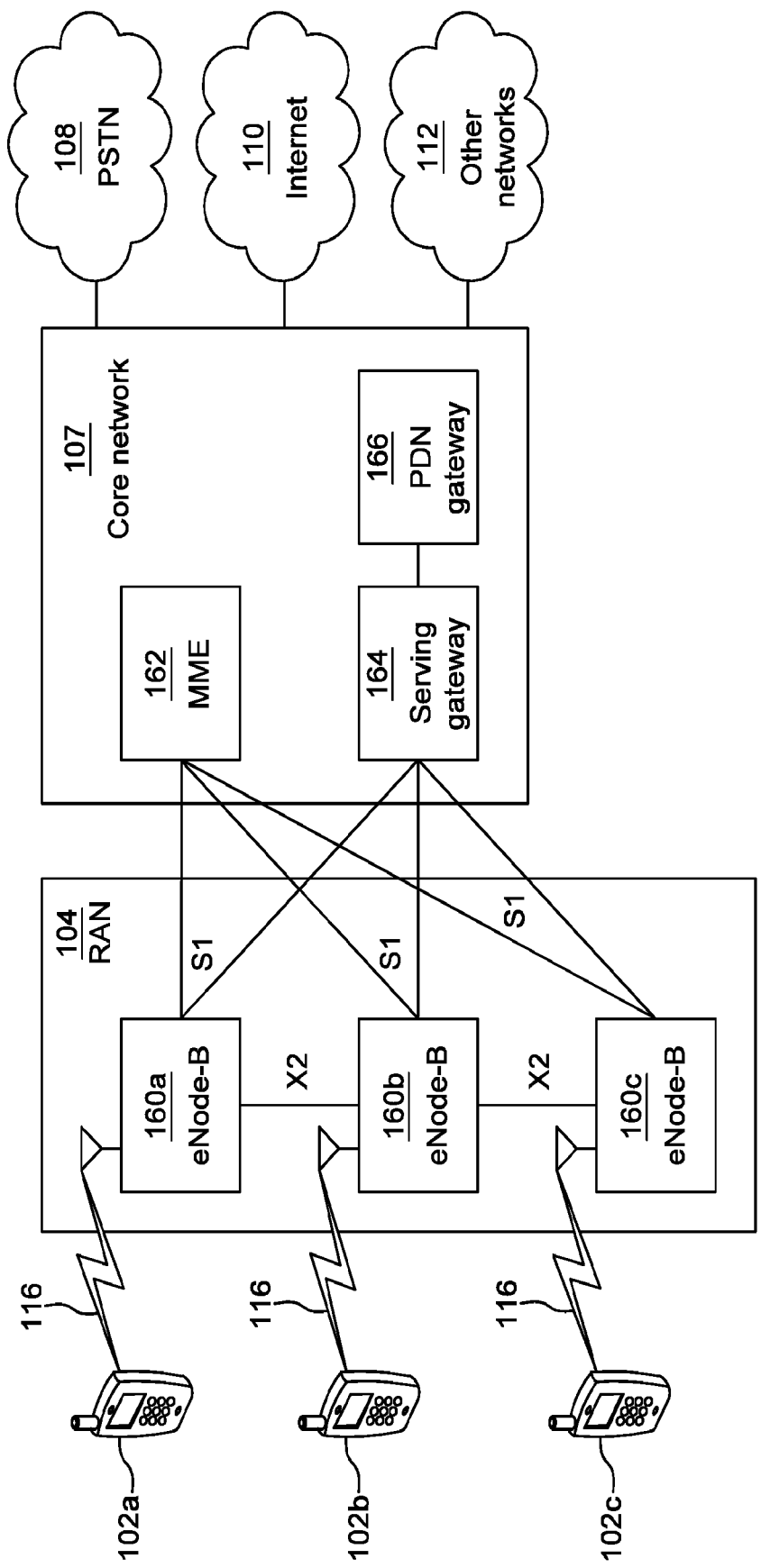
FIG. 1C is a system diagram that shows an example of a RAN architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNodeB handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
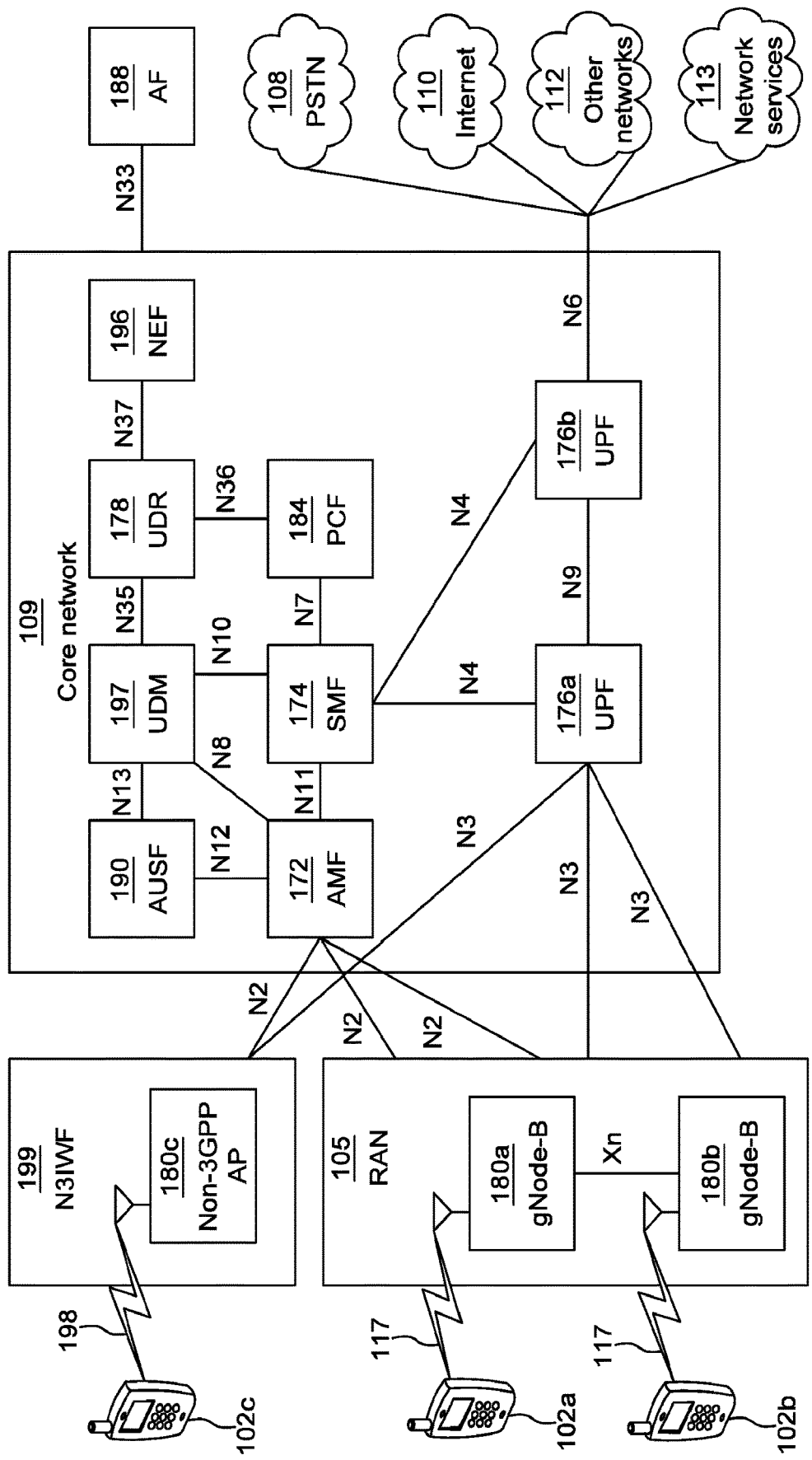
FIG. 1D is a system diagram that shows an example of a RAN architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilitates communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
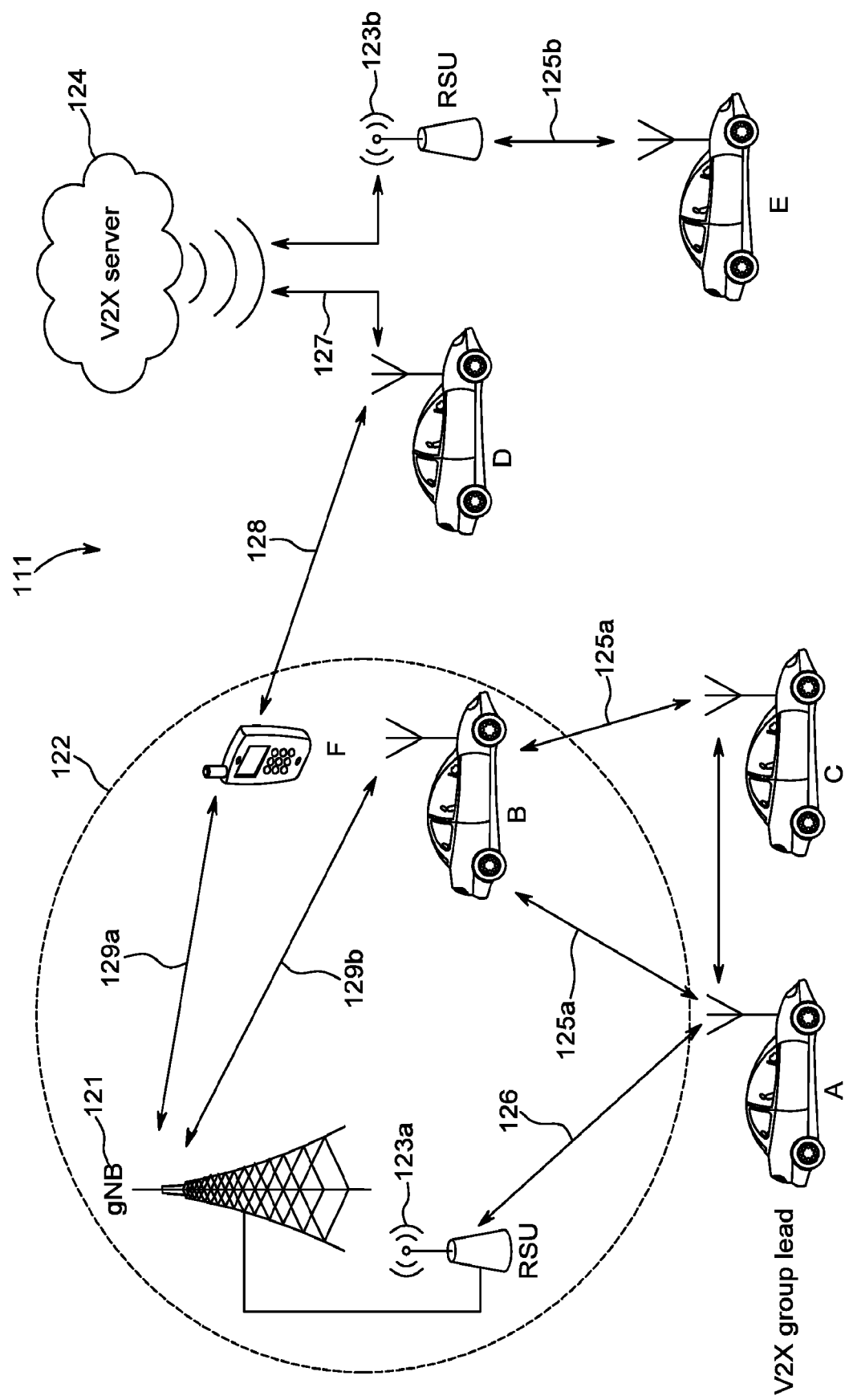
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125a,125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
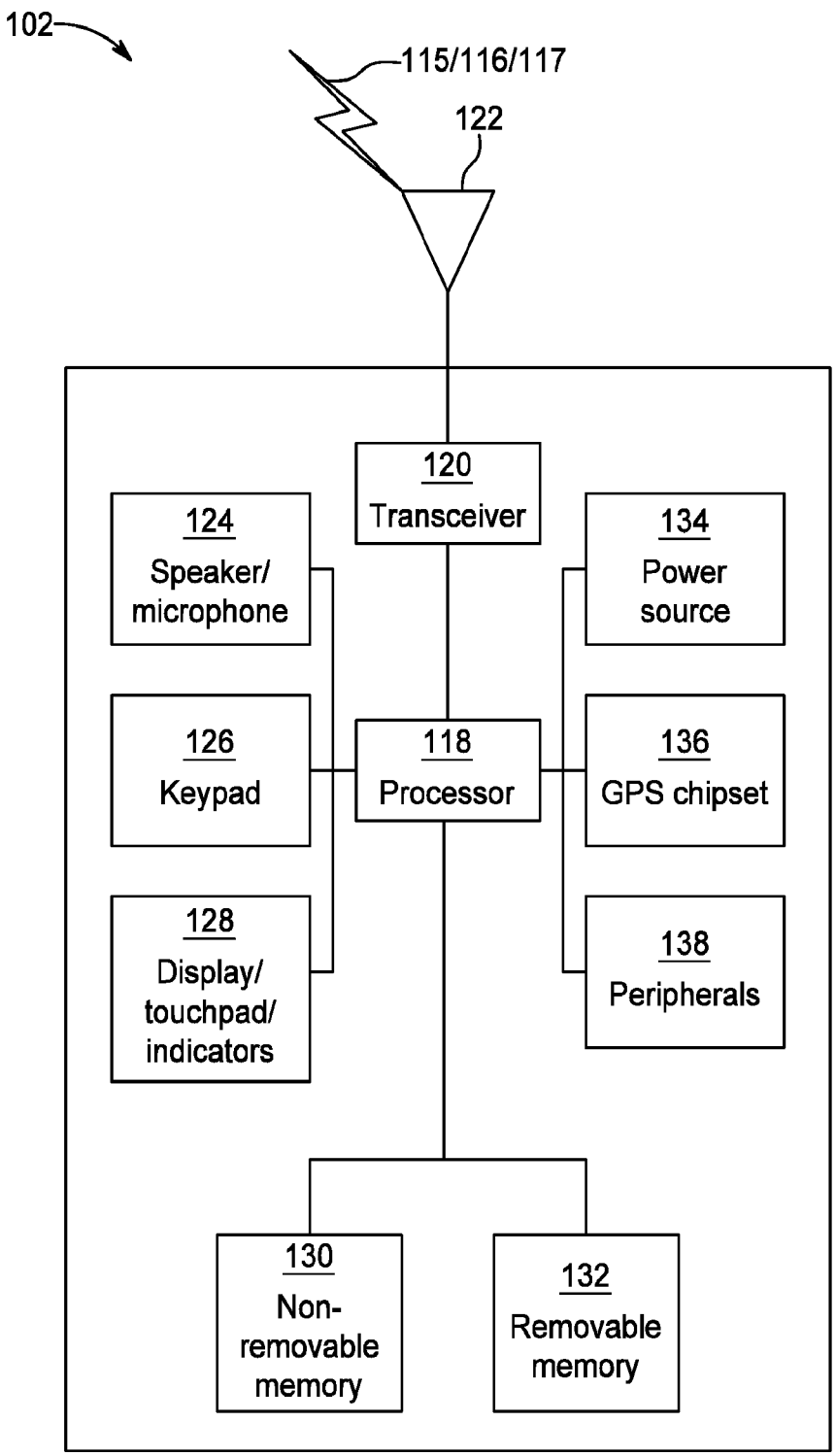
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
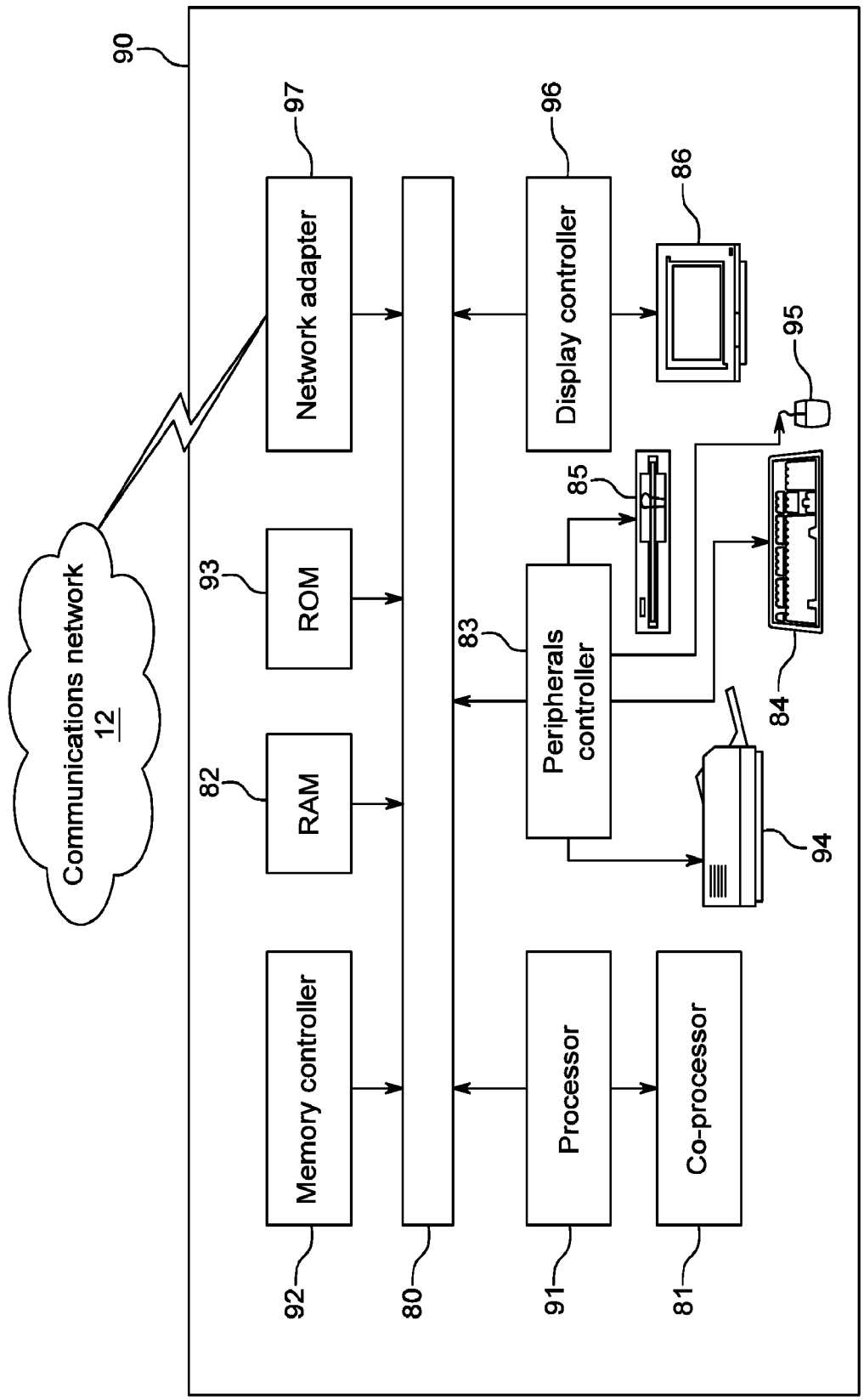
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

NR Radio Resource Management (RRM) Measurements

The purpose of RRM is to ensure the efficient use of the available radio resources and to provide mechanisms that enable network to meet radio resource related requirements. In particular, RRM provides means to manage (e.g. assign, re-assign and release) radio resources. It includes functions such as: radio bearer control, radio admission control, mobility control, and packet scheduling. In order to provide these functions, UE specific measurements are required—both locally at the UE, and at the network (gNB).

In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

For NR, the network may configure the UE to perform measurements based on SS/PBCH blocks (SSBs) or CSI-RS (Channel State Information Reference Signals) resources, where the measurement quantity may be Reference Signal Received Power (RSRP), Reference Signal Received Quality (RSRQ) or Signal-to-Noise and Interference Ratio (SINR). The physical layer measurements for NR are defined in 3GPP TS 38.215, NR; Physical layer measurements (Release 15), V15.2.0, which is incorporated by reference.

LTE Sidelink RRM Measurements

As part of the LTE ProSe and V2X work, sidelink specific RRM measurements were also defined. Namely:
  Sidelink Received Signal Strength Indicator (S-RSSI): total received power per symbol. It is used in determining which sub-channels are busy
  PSSCH Reference Signal Received Power (PSSCH-RSRP): based on demodulation reference signals associated with PSSCH,
  Channel busy ratio (CBR): Channel busy ratio (CBR) measured in subframe n is defined as follows:
    For PSSCH, the portion of sub-channels in the resource pool whose S-RSSI measured by the UE exceed a (pre-)configured threshold sensed over subframes [n−100, n−1];
    For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.
  Channel occupancy ratio (CR):
  Channel occupancy ratio (CR) evaluated at subframe n is defined as the total number of sub-channels used for its transmissions in subframes [n−a, n−1] and granted in subframes [n, n+b] divided by the total number of configured sub-channels in the transmission pool over [n−a, n+b].

NR Radio Link Monitoring (RLM) and Radio Link Failure (RLF)

The terms radio link monitoring (RLM) and Radio Link Failure (RLF) are often used interchangeably. Although tightly linked, hereafter an attempt is made to distinguish between the two. RLM refers to the procedures related to monitoring the radio link between the UE and the gNB. This monitoring can be at many layers of the protocol stack: physical layer, MAC layer, and RLC layer. Events can occur at each of these layers that can signal a poor radio link exists between the UE and the gNB. Radio link quality is important to guarantee that there is a viable signaling connection between the UE and gNB. If this link quality is deemed poor, the UE may declare an RLF, and subsequently attempt to recover from this RLF either by trying to re-establish a connection to another gNB, or failing that, to move the UE into an RRC-IDLE state.

In RRC_CONNECTED, the UE declares Radio Link Failure (RLF) when one of the following criteria are met:
  Expiry of a timer started after indication of radio problems from the physical layer (if radio problems are recovered before the timer is expired, the UE stops the timer);
  Random access procedure failure;
  RLC failure.

RLF Caused by Poor Downlink Radio Link Quality

Figure 2:
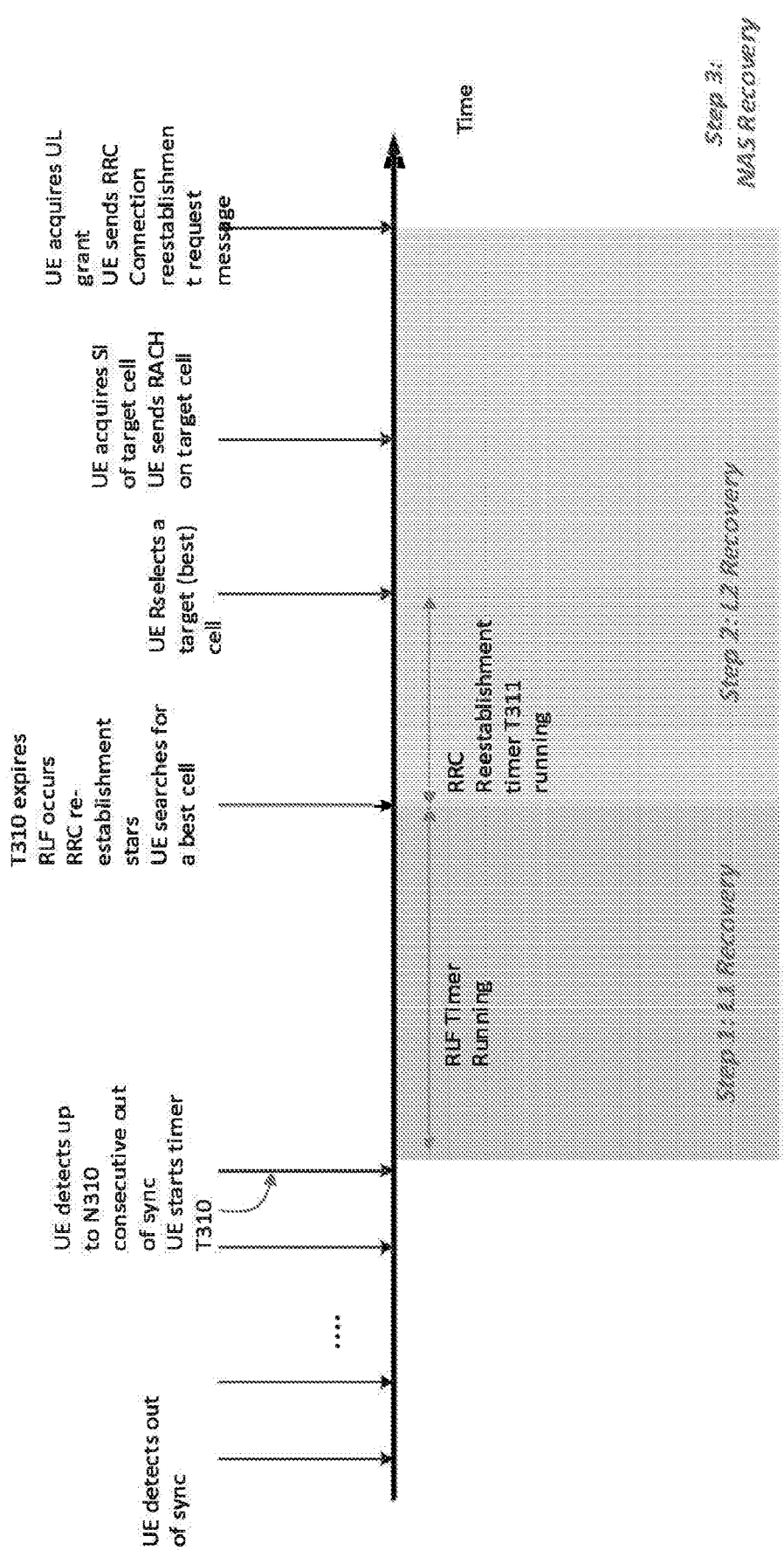
FIG. 2 shows a procedure for RLM and RLF detection in accordance with an exemplary embodiment.

The overall procedure is based on counters and timers, as shown in FIG. 2. FIG. 2 shows a procedure for RLM and RLF detection in accordance with an exemplary embodiment.

A UE is configured with RadioLinkMonitoringConfig IE, which is used to configure radio link monitoring for detection of cell radio link failure (as well as beam radio link failure). The physical layer monitors one of 2 possible metrics to determine in-sync (IS) or out-of-sync (OOS) conditions: SSB or CSI-RS. The measurements are compared to Qin and Qout thresholds (also provided to UE through RRC configurations).

The UE monitors the number of consecutive OOS indications from the physical layer. When this number equals N310, the UE starts a T310 timer (Step 1). If during this time, the UE recovers synchronization, the timer is stopped. If the T310 timer expires the UE declares RLF (Step 2). The period of time during which T310 is running is known as Phase 1 of RLF procedure.

After RLF declaration, the UE attempts to re-establish its connection to the network. The UE may search for a best cell. The period of time during which the T311 timer is running is referred to as Phase 2 of RLF procedure.

The values for T310, T311, N310 are all configured by the network.

The UE then resects a target cell. The UE then acquires SI of a target cell and sends RACH on the target cell. Finally, the UE acquires UL grant and the UE sends a RRC connection reestablishment request (Step 3).

RLF caused by Random Access Procedure Failure

The random access procedure for NR is based on sending preambles with slightly increasing transmit powers, until the gNB is able to "hear" this preamble without collision. The UE will attempt this preamble transmission a finite number of times (governed by the network configured parameter preambleTransMax). If a MAC layer has difficulty sending a MAC PDU through the RACH, and it has reached the maximum number of attempts for the preamble transmission for this MAC PDU, the MAC layer indicates random access problem to the upper layers, and the RRC declares a Radio link failure.

The UE then starts Phase 2 of the RLF procedure, as described for the downlink radio link quality case in Section 1.2.1.

RLF Caused by RLC Retransmissions

PDUs transmitted using RLC AM, are acknowledged by the receiving entity. In the case of Uu NR based transmissions, the RLC AM is between the UE and the gNB. Depending on the direction of the transmission (uplink or downlink), either entity can play the role of transmitting entity (UE for uplink transmission or gNB for downlink transmission) or receiving entity (UE for downlink transmission or gNB for uplink transmission). In the following we will only consider the uplink direction, but the procedure may also be applied to the downlink direction.

For RLC AM, the UE maintains a transmission window to keep track of all RLC SDUs that have been transmitted and not yet acknowledged by the gNB. The UE can receive a negative acknowledgement (notification of reception failure by the gNB) for an RLC SDU (or an RLC SDU segment) through a STATUS PDU from the gNB. Each RLC SDU that receives a negative acknowledgement needs to be retransmitted.

The UE maintains a count of the number of retransmissions for each RLC SDU. If this number exceeds a network configured maximum (maxRetxThreshold) the RLC layer indicates to the upper layers, that the maximum number of retransmissions have been reached. As a result, the RRC declares a Radio link failure.

The UE then starts Phase 2 of the RLF procedure, as described for the downlink radio link quality case in Section 1.2.1.

PC5 Keep Alive Mechanism

As part of the Proximity Services (ProSe), 3GPP defined an upper layer keep alive mechanism to make sure that the peer UEs communicating over the PC5 interface still need the PC5 direct link. The mechanism is based on the exchange of PC5-S signaling messages between the peer UEs, and the maintenance of timers at the peer UEs. The overall procedure is depicted in FIG. 3, which shows the exchange of DIRECT_COMMUNICATION_KEEPALIVE/DIRECT_COMMUNICATION_KEEPALIVE_ACK messages.

Figure 3:
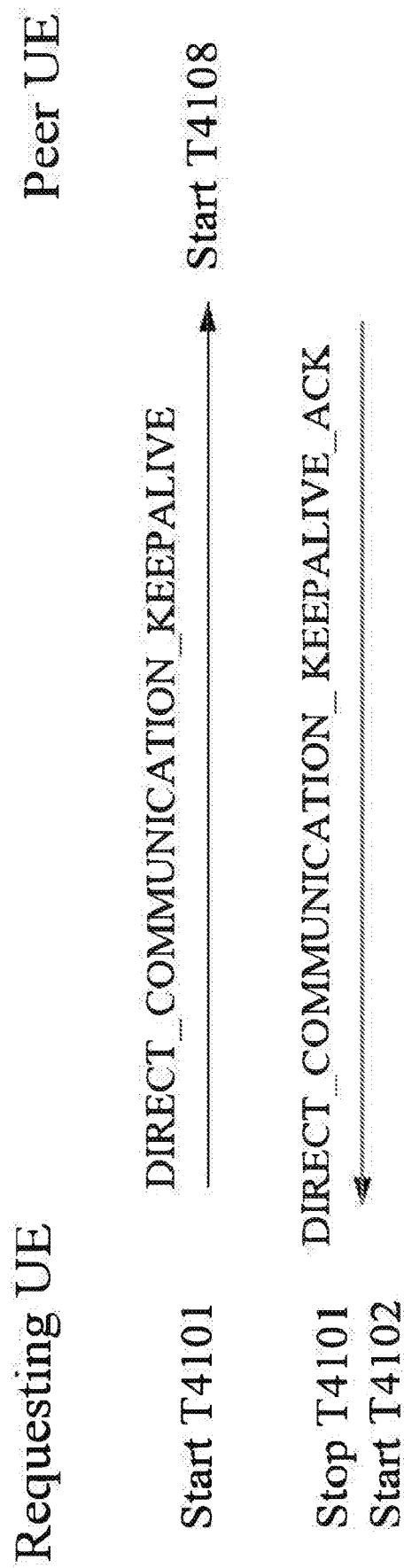
FIG. 3 shows a keep alive procedure in accordance with an exemplary embodiment.

FIG. 3 shows a keep alive procedure in accordance with an exemplary embodiment.

A Requesting UE will send a Keep Alive message under the following conditions: it hasn't received anything (signaling or user data) from the peer UE for a period of time (as specified by parameter T4102), and upon request from a higher layer (e.g. the application) to check the direct link is alive. Optionally, if a maximum inactivity period over this direct link has been observed (as specified by parameter T4108).

A UE will release a PC5 connection to the peer UE under the following conditions: upon request from a higher layer (e.g. the application) to release the direct link, it has retransmitted a keep alive message to a peer, a number of times, with no acknowledgement, and optionally, if a maximum inactivity period over this direct link has been observed (as specified by parameter T4108).

Problem Statement

A problem addressed by a device and method in accordance with the present disclosure is divided into two main sub-areas: related to RRM and related to RLM/RLF.

RRM

Configuration of RRM measurements: UEs need to know when and what to measure. In the Uu case the signals to measure are always transmitted by the gNB. In contrast the V2X UEs suffer from the half duplex problem (UE transmits or receive data to/from another UE in the time duration which UE should perform measurement)

RRM Measurements based on SL SSB: In some cases, the SL SSB is not suitable for measurement. Multiple UEs may share the same SLSSID and in some use cases, the UEs may get their synchronization from alternate sources: GNSS or gNB. How to perform measurements in these cases is not clear.

RRM Measurements based on Reference Signals: In Transmission Mode 2 type deployments, the UEs need to acquire the channel (based on sensing). A receiving UE may not know when a transmitting UE has acquired the channel and has transmitted the reference signal. Furthermore, which reference signal to use is still not known.

RLM/RLF

Using the PC5 keep-alive mechanism to manage poor sidelink radio link quality may not be efficient for the use cases envisioned in NR V2X. The mechanism is rather slow, relying on timers and retransmission counters maintained in the upper layers. During the latency time, the peer UEs may be transmitting over the sidelink and causing unnecessary interference. In addition, the keep-alive mechanism does not necessarily only reflect link quality. For example, a UE may refrain from sending a DIRECT_COMMUNICATION_ KEEPALIVE_ACK due to load reasons. As a result, an Access Stratum (AS) link monitoring mechanism may be useful for the NR V2X use cases.

Triggers for RLF on unicast: Triggers for SL RLF will likely be based on physical layer measurements and RLC-AM retransmission failure. However, the SL physical layer measurements may not be as accurate as for the Uu case and may result in a longer latency to declare RLF. Additional mechanisms may be needed to quickly determine when the sidelink quality is degraded Actions upon detection of RLF: The UE actions upon detecting a RLF on the sidelink are not defined. The notion of RRC Re-establishment is not valid on the sidelink, where the communication is targeted to a specific UE and not to the network (through one of its RANs).

Interaction with higher layers: Today the PC5-S protocol sends keep-alive messages between the peer UEs to make sure that both UEs are still capable of sidelink communication. The keep alive functionality as specified in LTE D2D relates to D2D PC5 direct link unicast and is used to detect when the UEs are not in communication range, or for example when there is no more data for transmission. It is not clear how this procedure will interact with any AS RLF procedure. Additionally, the higher layer may need to be notified even before a RLF occurs in order for it to take some proactive action. This interaction with the higher layer is not defined.

Groupcast Link Failure: Today no radio link monitoring is in scope for groupcast communication. In certain use cases, the reliability and latency requirements for the group require that quality of the groupcast link be maintained. For example, in a platoon with a platoon leader, the link to the leader is crucial for the safe operation of the platoon. How this link monitoring is done in combination with groupcast is not defined.

In this application, the above problems are addressed by at least the following:

1. Various triggers to declare SL Radio Link Failure (SL-RLF). These triggers are from the PHY, MAC, and RLC layer.
2. That the radio link quality of some SLs may be linked. These are referred to as linked SLs. If a SL connection is linked to another SL connection, then a radio link issue on the $2^{nd}$ SL will have an impact on the $1^{st}$ SL. For example, the $2^{nd}$ SL connection may be to a UE acting as a relay to a gNB, or it may be to a UE Scheduling Entity.
3. Various actions when a S-RLF is declared at a UE. Namely:
   a. clearing of the SL connection context and the tear down of all radio bearers on the impacted SL
   b. moving the SL to another resource pool
   c. moving the SL to another shared operating band
   d. informing the Upper layers and having it control the actions
   e. transferring the radio bearers on the impacted SL over to the Uu interface
4. Methods to allow Access Stratum keep alive procedures.
5. Methods to throttle RLF evaluation on/off at a UE involved in sidelink communication.
6. Methods to stop/stop transmission of Radio Link Monitoring Assistance Information (RLM-AI) on a sidelink. This RLM-AI allows a UE to better determine the sidelink status.

Detailed Disclosure

Note that in the following, UEs may be in-coverage of a gNB or evolved eNB for in-coverage case. To simplify, hereafter only the term gNB will be used, but it should be understood that this may refer to both a gNB or evolved eNB.

Figure 4A:
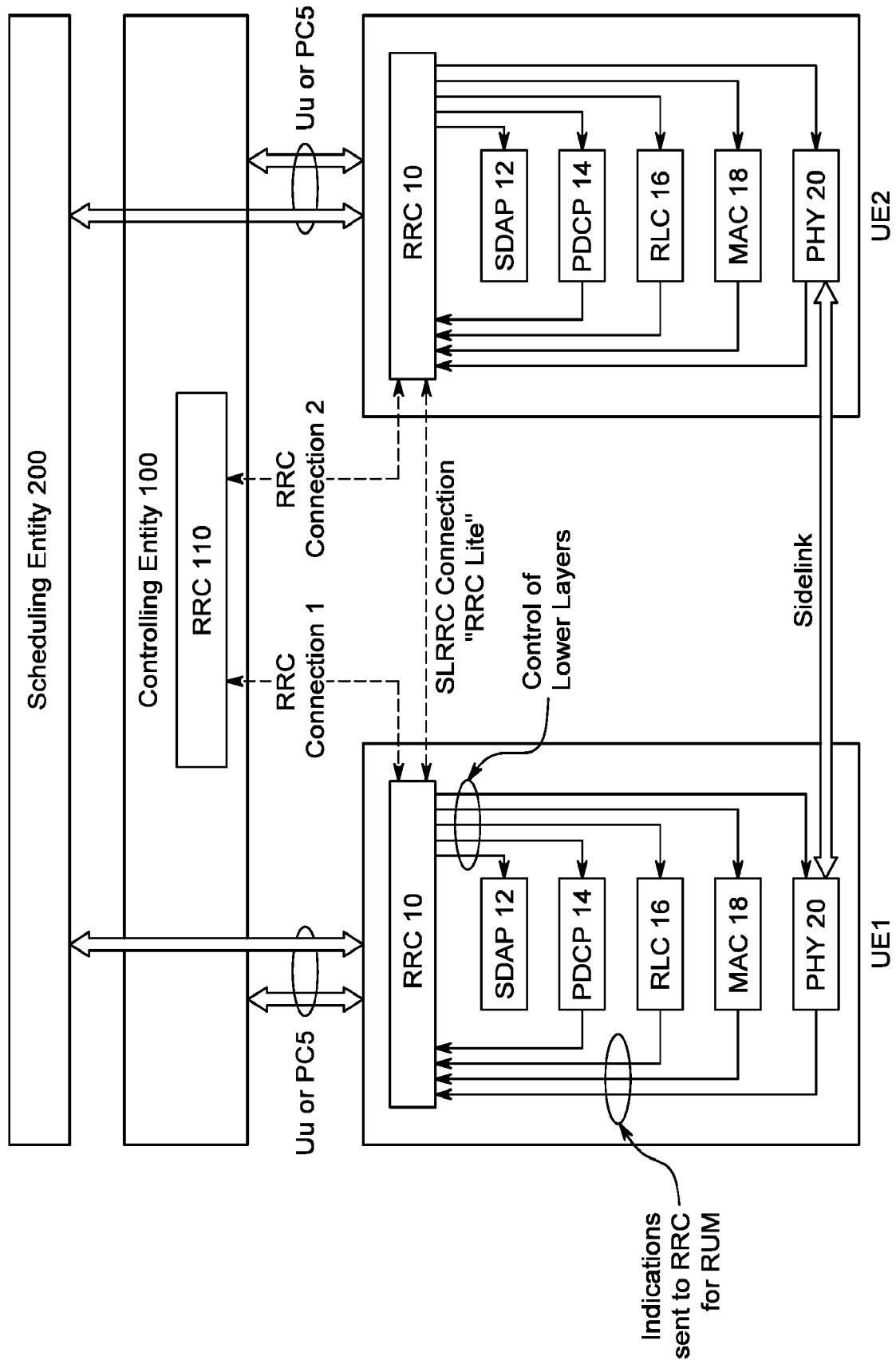
FIG. 4A shows a sidelink connection between peer UEs in accordance with an exemplary embodiment.

A generic SL unicast communication for NR V2X, is shown in FIG. 4A. The SL communication is between UE1 and UE2.

FIG. 4A shows a sidelink connection between peer UEs in accordance with an exemplary embodiment.

In particular, FIG. 4A shows two optional blocks: a controlling entity 100 which provides the radio resource control of the peer UEs (UE1 and UE2), as well as a scheduling entity 200 which is responsible for scheduling of transmissions between the peer UEs.

Various configurations/options are possible for the controlling entity 100 and scheduling entity:

For UEs that are in coverage, the controlling entity may be the gNB. In such cases, the communication between UE1/UE2 and the controlling entity 100 is over the Uu interface. UE1 and UE2 both have an RRC connection to the controlling entity 100.

For UEs that are using Resource Allocation Mode 1, the scheduling entity 200 may be the gNB. In such cases, the communication between UE1/UE2 and the scheduling entity 200 is over the Uu interface.

For UEs that are using Resource Allocation Mode 2, the scheduling entity 200 may be another UE that has scheduling capability, in which case the communication between UE1/UE2 and the Scheduling Entity 200 is over a PC5 interface. As a special case of this alternative, one of the UEs (UE1 or UE2) may be the Scheduling Entity 200, and this UE may schedule the transmissions for both UE1 and UE2.

For UEs that are out-of-coverage, the controlling entity 100 may be another UE, in which case the communication between UE1/UE2 and the Controlling Entity 100 is over a PC5 interface. As a special case of this alternative, one of the UEs (UE1 or UE2) may be the Controlling Entity 100.

In some cases, the controlling entity 100 and the scheduling entity 200 are co-located (for example in a gNB), however this is not always the case. In some cases, UE1 and UE2 may have different controlling entities. In some cases, UE1 and UE 2 may have their own Scheduling Entity. In this case, the resources used for sidelink transmission between UE1 and UE2 must be the same, even though they are scheduled by different Scheduling Entities.

In addition to the RRC connection to the controlling entity 100 and/or scheduling entity 200, UE1 and UE2 may also have a SL RRC (S-RRC) connection between each other. This S-RRC connection can be used for RRC signaling directly between the 2 UEs over PC5 interface.

Also, note that FIG. 4A shows a single SL between UE1 and UE2. It should be understood that this may be generalized to any number of simultaneous sidelinks. So UE1 and UE2 may share a SL, they may have a Uu interface to their controlling entity 100 and/or scheduling entity 200, and they may each have one or more additional sidelinks to other UEs.

UE1/UE2 send Channel Quality Information (CQI) about the SL between these two UEs, to its Scheduling Entity 200, e.g., gNB or scheduling UE. Note that hereafter, this CQI will be referred to as the SL CQI (S-CQI), to distinguish it from the CQI a UE sends in relation to the downlink or uplink on the Uu interface. Note that the CQI may be periodic or apenodic or scheduled.

If Controlling Entity 100 is a gNB, it can manage the RRC Connection to UE1 and the RRC connection to UE2 over the Uu interface. However, the Controlling Entity 100 cannot manage the S-RRC connection between UE1 and UE2. This RRC signaling is managed directly between UE1 and UE2.

If Controlling Entity 100 is another UE, it may need to manage the S-RRC Connection between itself and UE1/UE2, but it cannot manage the S-RRC connection between UE1 and UE2.

In cases that the SL radio quality between UE1 and UE2 degrades, it is expected that: The S-CQI provided to the Scheduling Entity 200 will indicate that the quality of the link is poor. The Scheduling entity 200 may, for example just wait to see if conditions improve, or tell UEs to use the lowest possible MCS.

Additionally, one or more of the lower access stratum layers (PHY, MAC, RLC, PDCP, SDAP) may provide some indication to the RRC layer at UE1 and/or UE2 that a SL radio link quality is poor, the Upper Layer (PC5-S) may provide some indication to the RRC layer at UE1 and/or UE2 that a keep-alive timer associated with the SL has expired, the Controlling entity 100 or the peer UEs (UE1 or UE2) may declare a sidelink radio link failure (SL RLF), the Controlling entity 100 may take some more proactive steps to help deal with the SL RLF, and the peer UEs may take some more proactive steps. to help deal with the SL RLF.

Procedure for Sidelink Radio Link Monitoring/Failure/Recovery

Figure 4B:
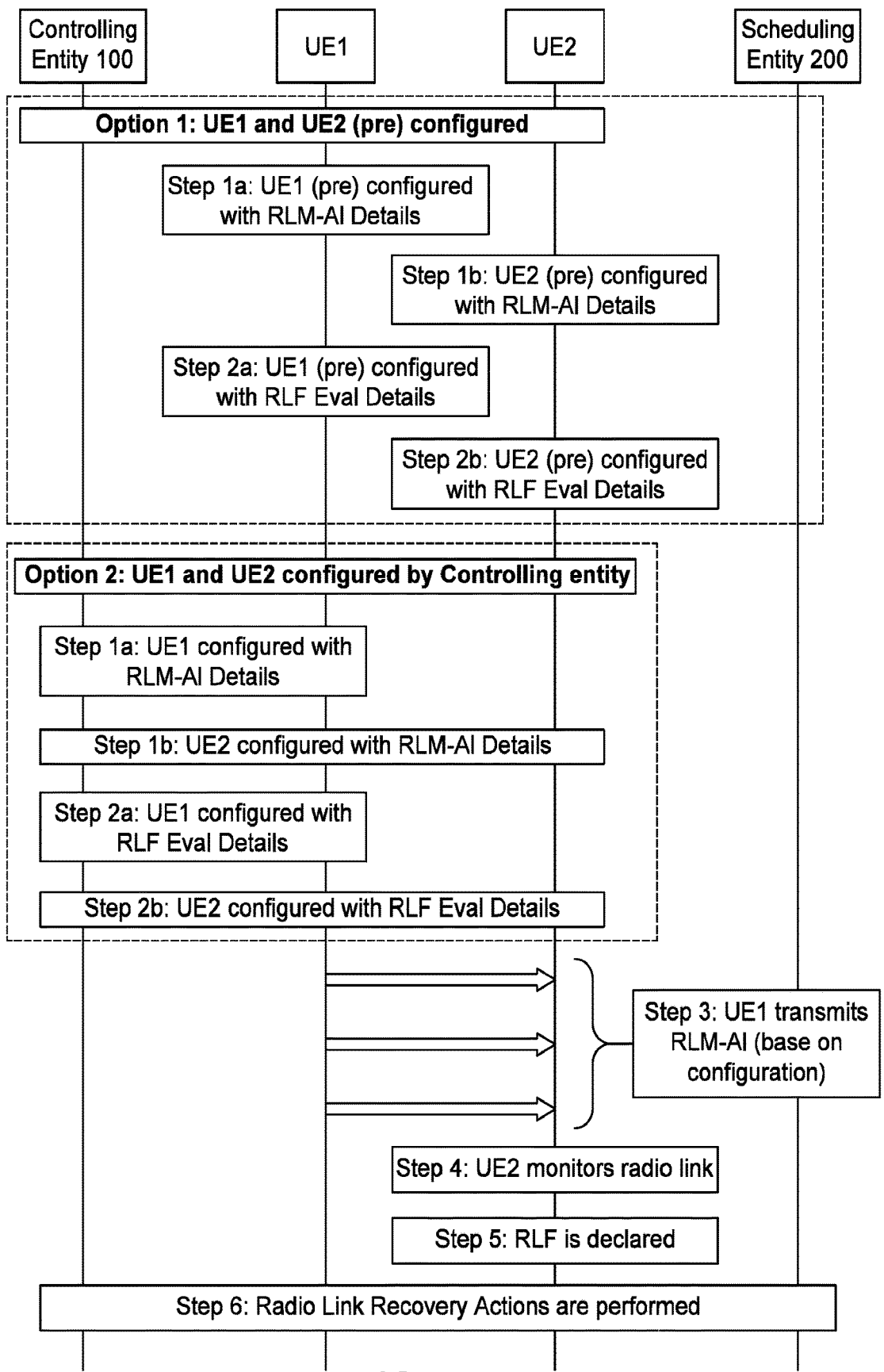
FIG. 4B shows a procedure for sidelink radio link monitoring, sidelink radio link failure evaluation, and SL radio link recovery.

FIG. 4B shows the proposed procedure for sidelink radio link monitoring, sidelink radio link failure evaluation, SL radio link recovery where we have two peer UEs (UE1 and UE2) transmitting on the sidelink, a Controlling Entity 100, and a Scheduling Entity 200. Note, in the following:

SL radio link monitoring (SL-RLM) refers to the process whereby a UE, controlling entity 100, or scheduling entity monitors/measures metrics to gauge the quality of a radio link. As a result of this monitoring, the UE, controlling entity 100 or scheduling entity may determine that there may be a problem with the radio link.

SL radio link failure (SL-RLF) evaluation refers to the procedure whereby a UE, controlling entity 100, or scheduling entity evaluates one or more monitored metrics, and determines whether the radio link quality of a sidelink is satisfactory or acceptable. If the UE, controlling entity 100 or scheduling entity determines that the link is not acceptable, a RLF may be declared.

SL radio link recovery (SL-RLR) refers to the recovery actions that may be taken to counter the SL RLF. Step 1: A UE is configured (shown as Option 2) or pre-configured (shown as Option 1) with details on indications/signals to transmit to assist in SL radio link monitoring. A UE is also configured or pre-configured with details on indications/signals that it can receive/monitor to assist in SL radio link monitoring. Hereafter we will refer to these indications/signals as Radio Link Monitoring Assistance Information (RLM-AI)

Step 2: A UE is configured (shown as Option 2) or pre-configured (shown as Option 1) with details regarding the evaluation of SL radio link failure. For example, the UE may be configured to only evaluate RLF if sidelink is being used for a certain V2X service.

Step 3: Based on the configuration or pre-configuration of the RLM-AI, the UE may transmit the assistance information.

Step 4: The peer UE monitors the radio link based on one or more metrics.

Step 5: A SL-RLF is declared. This declaration may occur at one of the peer UEs, at the Controlling Entity 100, at the Scheduling Entity 200, at the gNB (or eNB). In FIG. 4B, a peer UE makes the RLF declaration.

Step 6: Recovery actions are taken to counter the SL RLF.

Radio Link Monitoring Assistance Information

Types of SL RLM-AI

Radio Link Monitoring Assistance information refers to any information sent by a UE that may be used by the peer UE to assess the sidelink radio quality between the two UEs. RLM-AI, may include one or more of the following:

Demodulation Reference Signal (DMRS) carried in PSCCH. The DMRS may be sent as part of an SCI that schedules sidelink transmission. Alternatively, the DMRS may be sent as part of an SCI that includes no scheduling information. This may be carried in a dedicated SCI format.

Demodulation Reference Signal (DMRS) carried in PSSCH. The DMRS may be sent as part of a transport block that includes sidelink data. Alternatively, the DMRS may be sent as part of a transport block that includes dummy data. The size of the transport block may also be configured SL Synchronization Signal Block (S-SSB)

Sidelink Channel State Information Reference Signal (SL-CSI-RS)

RLM Reference Signal (RLM-RS) from a UE. This may be a reference signal transmitted by a UE especially for RLM. The RLM-RS may be specific to a transmitting UE, but may be used by multiple receiving UEs for RLM purposes.

Access Stratum (AS) Keep-Alive mechanism: The peer UEs may exchange probe-like request/response messages on sidelink (PC5 interface) to assist in radio link monitoring. The message may be a sidelink RRC (i.e. PC5-RRC) message, a sidelink MAC CE, or a sidelink PHY layer signal. The request/response messages may be dedicated for RLM. Alternatively, these messages may be implicitly indicated by the regular PHY signaling already carried over the sidelink. For example, a SCI scheduling may be a probe request, and the returning HARQ feedback may be a probe response. As a second example, the probe request may be a CSI request in SCI, and the returning CSI report may be a probe response.

RLM-AI Configuration Details

The RLM-AI may be configured or pre-configured in the UE. The following information may be included in this configuration/pre-configuration:

Type of RLM-AI to transmit: UE may be (pre)configured to use one or more of the RLM-AI types.

Service type to RLM-AI mapping. The UE may be configured with a mapping of V2X service (for example PSID or ITS-AID of the V2X application) to RLM-AI type. For example, the UE may be configured to use RLM-RS for autonomous driving applications.

Sidelink Logical Channel priority to RLM-AI mapping. The UE may be configured to use a certain RLM-AI for sidelink traffic of a certain priority. For example, if the UE has sidelink traffic with a given priority, or given PQI value, it may use a certain RLM-AI type.

Resource information where RLM-AI is transmitted. In Mode 1 resource allocation mode, the UE may be provided with a list of one or more resources where the RLM-AI may be transmitted. The UE may transmit the RLM-AI in the provided resource. This resource may be dedicated for RLM-AI. This resource may be shared by more than one UE. The resource information where RLM-AI is transmitted may also be provided in a number of Mode 2 resource allocation modes—for example in mode 2(*d*) a Scheduling entity may provide the resource information, while in mode 2(c) the UE may be configured with a single SL transmission pattern, and there is no sensing procedure executed by UE.

RLM-AI transmit/receive intervals: The UE may be provided with an indication of when to transmit (or receive) RLM-AI. This may be in the form of a start time and stop time for RLM-AI transmission. In such a case, the UE may only try to transmit (or receive) the RLM-AI during this interval. Alternatively, the UE may be provided with a periodicity of RLM-AI transmission (or reception). For example, the UE may be configured to transmit (or receive) the RLM-AI every T1 seconds. The UE may be further configured to transmit (or receive) the RLM-AI every T1 seconds, for a duration of T2 seconds or for a certain number of times.

Layer 1 Destination UE ID List: The UE may be configured to transmit, or receive, the RLM-AI only if the UE has an ongoing service to a UE that is in the Destination UE ID list. Note that hereinafter the UE ID may be a Layer 2 ID or a Layer 1 ID, or some other unique identifier.

Layer 1 Source UE ID List: The UE may be configured to transmit or receive the RLM-AI only if the UE has an ongoing service to a UE that is in the Source UE ID list.

Transmission Cast: The UE may be configured to transmit the RLM-AI only for certain transmission cast types: unicast, groupcast, and/or broadcast.

Activation/Deactivation: The UE may be configured to activate/deactivate RLM-AI based on the configured RLM-AI transmit/receive intervals. Alternatively, the UE may be configured to dynamically activate/deactivate RLM-AI based on some trigger event, typically an aperiodic trigger event, at the UE.

Inactivity timers: The UE may be configured to transmit the RLM-AI based on the inactive timers if the sidelink has been inactive for a specified duration. This inactivity may be monitored for a specific Layer 1 Destination ID or for multiple Layer 1 Destination IDs, a specific Layer 1 Source ID or for multiple Layer 1 Source IDs.

RLM-AI set-up through configuration or pre-configuration in the UE

A set of peer UEs may be configured by their gNB, or eNB, or Controlling Entity with the necessary information to transmit/receive the RLM-AI. For example, through RRC signaling or PC5 RRC signaling. Alternatively, if the UEs are out-of-coverage, they may use pre-configuration to determine the necessary information to transmit/receive the RLM-AI. In both cases (configuration and pre-configuration), the transmitting UE may follow the configuration information to send the RLM-AI. Furthermore, the Receiving UE may also use the configuration information to configure itself to receive the RLM-AI. In cases where a UE has multiple sidelinks to the same destination, it may be configured with one or more active RLM-AI Configuration Details. For example, UE1 may have 2 services to UE2. A first service may require that UE1 send RLM-AI every 2 seconds and a second service may require that UE1 send RLM-AI every 1 second. In another example, UE1 may have a sidelink logical channel with a given PC5 QoS Identifier (PQI) that may require that UE1 send RLM-AI every 2 seconds and a second sidelink logical channel with a PQI that may require that UE1 send RLM-AI every 1 second. In such a case, UE1 may determine a combined configuration to satisfy both services or both sidelink logical channels. Using the same example above, UE1 may determine that the RLM-AI should be sent every second to satisfy both configurations. If necessary, the UEs may exchange PC5 RRC signaling so that both UEs are aware of the combined configuration.

RLM-AI set-up through RRC signaling between peer UEs

A set of peer UEs may be configured by their gNB, or eNB, or Controlling Entity with the necessary information to transmit/receive the RLM-AI. For example, through RRC signaling or PC5 RRC signaling. If the UEs are out-of-coverage, they may use pre-configuration to determine the necessary information to transmit/receive the RLM-AI. In both cases (configuration and pre-configuration), the transmitting UE may follow the configuration information to send the RLM-AI. As an alternative to configuration from gNB, or eNB, or Controlling Entity, or pre-configuration the RLM-AI may be set-up through PC5-RRC signaling between the peer UEs. This may as part of the PC5-RRC link establishment between the peer UEs or after link establishment. For example, the RLM-AI configuration may be included as part of the Access Stratum configuration exchange between UE1 to UE2. Alternatively, the RLM-AI configuration may be included as part of an initial AS capability exchange between the peer UEs. Alternatively, the RLM-AI configuration may be included as part of an initial PC5RRCConnectionRequest procedure (for example in the RRCReconfigurationSidelink message). Alternatively, the RLM-AI configuration may be included as part of a dedicated PC5RRCConnectionReconfiguration procedure.

In cases where a UE has multiple sidelinks to the same destination, it may be configured with one or more active RLM-AI Configuration Details. For example, UE1 may have 2 services to UE2. A first service may require that UE1 send RLM-AI every 2 seconds and a second service may require that UE1 send RLM-AI every 1 second. In another example, UE1 may have a sidelink logical channel with a given PC5 QoS Identifier (PQI) that may require that UE1 send RLM-AI every 2 seconds and a second sidelink logical channel with a PQI that may require that UE1 send RLM-AI every 1 second. In such a case, UE1 may determine a combined configuration to satisfy both services or both sidelink logical channels. Using the same example above, UE1 may determine that the RLM-AI should be sent every second to satisfy both configuration. If necessary, the UEs may exchange RRC signaling so that both UEs are aware of the combined configuration.

Steps for a typical case where a sidelink connection is to be established between UE1 and UE2, and where the RLM-AI configuration is included in a PC5RRCConnectionSetup message, are described below:

Step 1: UE1 sends PC5-RRC Connection establishment message to UE2 (e.g. PC15RRCConnectionRequest). This message may include one or more of the RLM configuration details. For example, UE1 may configure UE2 to send RLM-AI periodically (once every 200 mec for a period of 2 sec).

Step 2: UE2 responds to the PC5-RRC Connection establishment message (e.g. PC5RRCConnectionSetup), and may also include RLM configuration details for UE1.

Step 3: UE1 follows the requested RLM-AI configuration and sends RLM-AI as configured.

Step 4: UE2 follows the requested RLM-AI configuration and sends RLM-AI as configured.

Activating/Deactivating RLM-AI

The UE may be configured to transmit/receive RLM-AI based on the RLM-AI configuration details. For example, the RLM-AI may have information regarding the start time and end time of the RLM-AI, or the periodicity of the RLM-AI, or the service type that requires RLM-AI. The basic idea is that the UE could be configured to know when to transmit or receive the RLM-AI. For example, the UE could be configured with a schedule that configures the UE to send the RLM-AI every 1 second.

In mode 1, the UE could then ask the gNB or eNB for resources so that it could send the RLM-AI, or In mode 1, the UE could be further configured with the resource assignment for the RLM-AI transmission, In mode 2, the UE could use sensing to send (or try to send) the RLM-AI every 1 sec.

In these cases, the UE does not send RLM-AI based on any aperiodic trigger event. It is based solely on how it is configured (e.g. transit RLM-AI if service type=autonomous driving). Alternatively, the transmission/reception of the RLM-AI may be more dynamic, and based on some trigger event, typically an aperiodic trigger event, at the UE. In this section, various alternatives are proposed for the dynamic activating/deactivating of RLM-AI.

Based on Information Available to the UE

In this alternative, a UE may be triggered to activate RLM-AI. This may be based on radio link monitoring that the UE is performing on its existing ongoing sidelink communications. This monitoring may be at the UEs PHY layer, MAC layer, RLC layer, PDCP layer, or RRC layer or higher layer. Based on this monitoring, the UE may decide that the radio link is degrading or is at risk of failure. In response, the UE may activate RLM-AI and may:
  start transmitting RLM-AI according to the RLM-AI configuration information;
  inform the peer UE that the UE will start transmitting RLM-AI;
  ask the scheduling entity for resources so that the RLM-AI may be transmitted, or perform sensing to determine the resources to transmit the RLM-AI;

Based on Indication from Controlling Entity

In this alternative, the Controlling entity may tell a UE to start transmitting the RLM-AI, or to start receiving RLM-AI. The indication may be provided by means of RRC signaling, MAC CEs, DCI, SCI, or combination of RRC, MAC CE, DCI, and SCI. The Controlling entity may provide one or more RLM-AI configuration details. In response, the UE may activate RLM-AI and may:
  start transmitting RLM-AI according to the RLM-AI configuration information;
  inform the peer UE that the UE will start transmitting RLM-AI;
  ask the scheduling entity for resources so that the RLM-AI may be transmitted, or perform sensing to determine the resources to transmit the RLM-AI;

Based on Indication from Scheduling Entity

In this alternative, the Scheduling entity may tell a UE to start transmitting the RLM-AI, or to start receiving RLM-AI. The indication may be provided by means of RRC signaling, MAC CEs, DCI, SCI, or combination of RRC, MAC CE, DCI, and SCI. The Scheduling entity may provide one or more RLM-AI configuration details. In response, the UE may activate RLM-AI and may:
  start transmitting RLM-AI according to the RLM-AI configuration information;
  inform the peer UE that the UE will start transmitting RLM-AI;
  ask the scheduling entity for resources so that the RLM-AI may be transmitted, or perform sensing to determine the resources to transmit the RLM-AI;

Based on Indication from Peer UE

In this alternative, a peer UE may perform radio link monitoring at its PHY layer, MAC layer, RLC layer, PDCP layer, RRC layer, or higher layer. This radio link monitoring may be performed on existing ongoing sidelink communications at the peer UE. Based on this monitoring, the peer UE may decide that the radio link is degrading or is at risk of failure. As a result, it may want to take more measurements before declaring a RLF. The peer UE may tell the UE to start transmitting the RLM-AI, or to start receiving RLM-AI. The indication may be provided by means of RRC signaling, MAC CEs, SCI, or combination of RRC, MAC CE and SCI. The UE may provide one or more RLM-AI configuration details. In response, the peer UE may activate RLM-AI and may:
  start transmitting RLM-AI according to the RLM-AI configuration information;
  inform the peer UE that the UE will start transmitting RLM-AI;
  ask the scheduling entity for resources so that the RLM-AI may be transmitted, or perform sensing to determine the resources to transmit the RLM-AI;

SL Radio Link Monitoring (S-RLM)

In the following, a number of triggers are proposed to help identify SL radio link issues. A UE may use one or more of the following to gauge the status of the SL, and to trigger a S-RLF.

Triggers Related to the Physical Layer

In the following it is proposed that the physical layer monitor the status of the SL and send indications to the RRC layer to control the SL Connection.

In a first alternative, the PHY layer continually monitors the reception resource pools, decodes the PSCCH and PSSCH, and makes SL radio link measurements. The UE may measure the Sidelink Reference Signal Received Power (SL-RSRP) over PSCCH's Demodulation Reference Signal (DMRS). Depending on the information included in the SCI, the PHY layer may track this measurement per Layer 1 source ID, Layer 1 destination ID, or combination of Layer 1 source/destination ID. The UE may also measure the SL-RSRP over PSSCH's DMRS.

The PHY layer may track this measurement per layer 1 source ID, layer 1 destination ID, or combination of Layer 1 source/destination ID. The UE may be configured:
  To measure the SL-RSRP via PSCCH RSRP and/or PSSCH RSRP
  With the SL communications for which this measurement is to be provided. This may be for all observed SL communications, only for specific SL communications (from a particular layer 1 source ID to layer 1 destination ID), for targeted layer 1 source IDs, for targeted layer 1 destination IDs, or any combination thereof.
  With a reporting frequency. That is the PHY layer may be configured to provide this information to the RRC layer periodically, for every K measurements, or based on the layer 1 measurement being above or below some configured threshold.

In a second alternative, the PHY layer continually monitors the V2X SL synchronization signals and/or Sidelink Reference Signal (SL-RS) such as Sidelink Channel State Information Reference Signal (SL-CSI-RS), and makes SL radio link measurements. The UE may measure the Reference Signal Received Power for the SL Synchronization Signal Block (S-SSB) and/or SL-RS (e.g. SL-CSI-RS). Hereafter, this will be referred to as the S-SSB RSRP or SL-RS RSRP, respectively. If the synchronization source is the peer UE of the SL for which the quality is to be measured, the PHY layer may track this measurement per layer 1 source ID The UE may be configured:

To measure the RSRP of S-SSB and/or SL-RS

With the reporting frequency. That is the PHY layer may be configured to provide this information to the RRC layer periodically, for every K measurements, or based on the layer 1 measurement being above or below some configured threshold.

In another alternative, the PHY layer may continually monitor the hypothetical BLER (e.g. of a hypothetical PSCCH with certain parameter settings) on the SL. This is based on the measurements of the S-SSB RSRP and/or CSI-RS. The UE PHY may estimate the metric for multiple RS (e.g. 2 S-SSBs and 3 CSI-RSs), and indicate an issue to the higher layers only if the metrics for all RSs are below the threshold. The UE may be configured:

To measure the SL BLER

With the reporting frequency. That is the PHY layer may be configured to provide this information to the RRC layer periodically, for every K measurements, or based on the layer 1 measurement being above or below some configured threshold.

In another alternative, the PHY layer may continually monitor the quality of the synchronization source, either from the GNSS, a gNB, or another UE. If the UE determines that synchronization from this source has been lost, it may provide an indication to its higher layer, e.g., the RRC layer.

In another alternative, the PHY layer may use HARQ information to help monitor the radio quality of the sidelink. NR V2X supports HARQ feedback and HARQ combining. HARQ-ACK feedback for a PSSCH is carried in Sidelink Feedback Control Information (SFCI) formats via a Physical Shared Feedback Channel (PSFCH). If a UE transmits a transport block to another UE, it expects to receive HARQ feedback on the PSFCH. If no feedback is received, the UE may use this as an indication of poor SL radio link quality. If a HARQ-NACK is received for cases where the initial transmission is made with low MCSs, the UE may use this as an indication of poor SL radio link quality.

The UE may be configured:

To send an indication for every missing HARQ feedback and/or HARQ-NACK,

To send an indication when the number of missing HARQ feedbacks and/or HARQ-NACKs exceeds a threshold.

With the SL communications for which this indication is to be provided. This may be for all observed SL communications, only for specific SL communications (from a particular layer 1 source ID to layer 1 destination ID), for targeted layer 1 source IDs, for targeted layer 1 destination IDs, or any combination thereof.

In another alternative, the PHY layer may use beam failure to help monitor the radio quality of the sidelink. If a UE suffers a beam failure and is unable to recover the beam, the UE may use this as an indication of poor SL radio link quality.

Triggers Related to the MAC Layer

In some cases, a UE may be required to use a Random Access procedure between the two UEs, prior to initial data transmission on the sidelink. For example, this may be to determine the initial UE transmit power on the sidelink, or to achieve better timing synchronization on the sidelink. The procedure is expected to be similar to the Random Access procedure used on the Uu interface, where an initiating UE will send preambles with higher and higher power, until a preamble is acknowledged with a form of random access response. Note that in cases where the UE uses channel sensing to determine the SL resources, the initiating UE may use a Contention Based RACH procedure. In cases where a Scheduling Entity schedules the SL resources, the initiating UE may use a Contention-free RACH procedure, with the Scheduling Entity providing the initiating UE information about which preamble to use.

The UEs may be configured with a maximum number of preamble transmission attempts allowed per MAC SDU. If an initiating UE reaches this maximum number, the MAC layer may indicate to the RRC, that a SL random access issue has been observed.

Triggers Related to the RLC Layer

In some cases, sidelink communication between two UEs may rely on RLC acknowledged mode (RLC AM). It is proposed that a UE be configured with SL specific maximum number of RLC AM retransmissions (maxSLRetxThreshold). If an initiating entity reaches this maximum number of RLC retransmissions, it may indicate a RLC issue to the RRC layer, but not necessarily that this should result in an RLF declaration. The latter depends on whether the logical channel associated with the RLC has been duplicated over a primary cell (PCell) or Secondary Cell (SCell). Only logical channels that go over the PCell may trigger an RLF declaration.

In the case that carrier aggregation duplication is not configured and/or not activated for the SL communication between the peer UEs, then if an initiating UE reaches this maximum number of RLC retransmissions, the RLC layer may indicate to the RRC, that an S-RLF should be declared as a result of a SL RLC issue being observed.

In the case that carrier aggregation duplication is configured and activated for the SL communication between the peer UEs, then if an initiating UE reaches this maximum number of RLC retransmissions, it may indicate to the RRC, that an S-RLF should not be declared as a result of a SL RLC issue, if the corresponding logical channel allowedServingCells only includes SCell(s). Otherwise, the RLC layer may indicate to the RRC, that an S-RLF should declared as a result of a SL RLC issue.

Triggers Related to the PDCP Layer

In some cases, sidelink communication between two UEs may rely on in sequence delivery maintained by the PDCP layer. The receiving PDCP entity uses a sequence number to help reorder packets. However, the receiving PDCP entity will not wait indefinitely for a missing PDCP SDU. If a reordering timer expires, the PDCP entity will push all SDUs to the upper layers, It is proposed to use the expiry of the reordering timer, as an indication of poor radio link quality, In addition, if the receiving PDCP has a reordering buffer with large gaps in the sequence numbers, this may also be used as an indication of poor radio link quality.

Triggers Related to the RRC Layer

A UE communicating on a SL, may be under the coverage of a gNB This UE may have an RRC connection to this gNB. This UE may monitor both the DL radio link as well as the SL radio link, and may declare a link failure on each if these links. A UE may be configured to have a SL radio link linked to the DL radio link. These UEs may not be able to fully/properly use these SL radio links without a proper functioning DL radio link. For example, the UE may rely on the radio link to the gNB for synchronization or for SL scheduling. It is proposed that a DL RLF may be used by the RRC, as an indication of a future/pending SL radio link issue.

In addition, it may be possible that some sidelinks are linked. For example, a UE may have a first sidelink to a scheduling UE and a second sidelink to a remote UE. The UE may act as a relay to the remote UE. If the UE declares a S-RLF on the sidelink to the scheduling UE, it may no longer be able to act as a relay to the remote UE, and the RRC may use this as an indication of a future/pending SL radio link issue on the SL to the remote UE.

A UE may be configured with information on how the SLs are linked. For example,

SL1 may be linked to SL2

SL3 may be linked to DL radio link

Note that the description above assumes that a failure on a linked radio link will always lead to an RLF on the SL. As an alternative, a radio link failure on a linked radio link may be used to modify/adapt the parameters of the radio link monitoring on the SL. For example, the SL RLM may use different values for the counters or timers, the SL RLM may use lower thresholds, or may report measurements more often.

In addition, the RRC layer may use the physical location and distances between the 2 UEs to help determine if a SL radio link will fail. For example, two UEs can have both an FR1 SL and an FR2 SL, and can exchange the location information using the FR1 SL. If one of the peer UEs determines that their distance is out of FR2 communication range, its RRC layer could trigger a S-RLF failure for FR2. In a scenario that both UE1 and UE2 are in coverage, the controlling entity may know the location of UE1 and UE2, and use this information to monitor the distance between them. If the RRC layer of the controlling entity determines that the UEs are out of communication range, it can trigger a S-RLF.

Triggers Related to the Upper Layers (PC5-S)

As part of the PCF-S protocol, UEs send keep alive messages to each other to make sure that the UEs on the sidelink are still in range and still need/require the sidelink. The PC5-S may signal to the RRC that a keep-alive timer for a sidelink has expired. This signal may contain an identifier to help identify the SL in the access stratum. For example, this signal may include a layer 1 source ID and layer 1 destination ID pair, or some SL connection identifier.

Triggers at the Scheduling/Controlling Entity

The Scheduling Entity is aware of all UEs for which it is providing sidelink transmission resources. In order to properly schedule these UEs for sidelink transmission, the Scheduling Entity may need BSR/SR reports from the transmitting UEs as well as CSI reports from the receiving UEs. If the Scheduling Entity has requested a CSI report from the receiving UE and none is received, the Scheduling Entity MAC (or PHY) layer may notify the RRC layer that there has been a missing CSI report. This is a possible indication that the Scheduling Entity radio link to the receiving UE is poor.

In addition, the Controlling Entity may also configure measurement reporting at a UE, for one or more metrics that the UE is monitoring. This may be for periodic reports or one-time reports. If the Controlling entity fails to receive these measurement reports, the Controlling Entity may also use this as a possible indication that the Controlling Entity radio link to this UE is poor.

RRC Configuration and Control at UE1 and UE2

UE Configuration related to S-RLM

Figure 5:
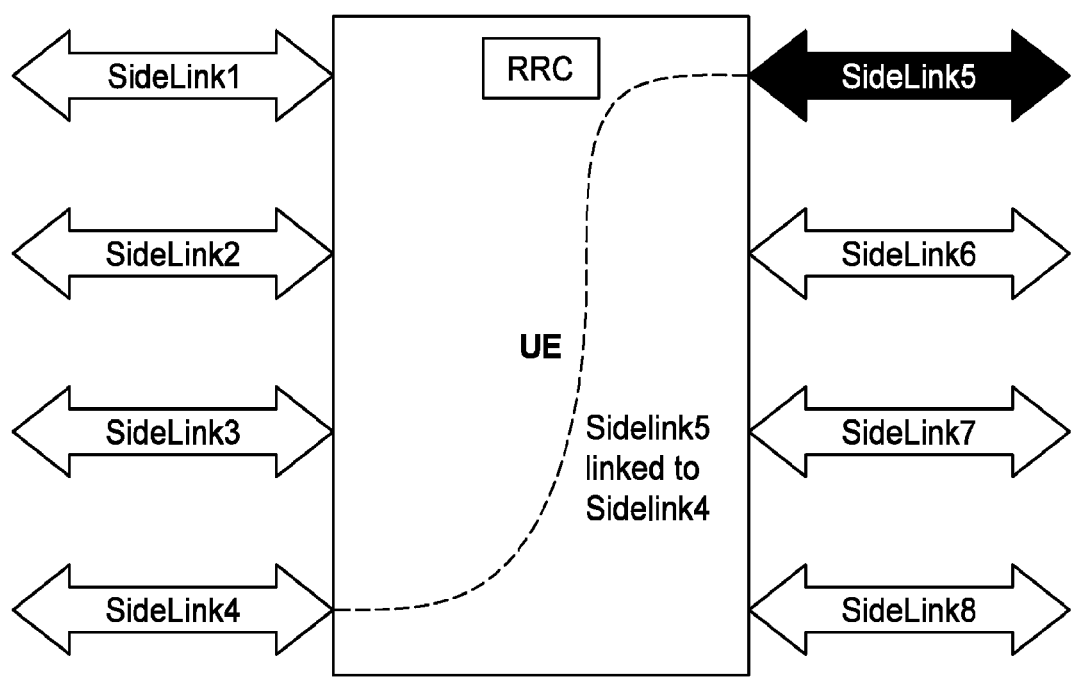
FIG. 5 shows a UE with multiple sidelinks in accordance with an exemplary embodiment.

FIG. 5 shows a UE with multiple simultaneous SLs. This UE may also have a Uu interface to a gNB.

For each of these SLs, the UE may be configured with a SL Configuration. The SL configuration may be provided by means of RRC signaling, MAC CEs, DCI, or combination of RRC, MAC CE and DCI. In a typical embodiment, the configuration is provided using the RRCReconfiguration message. The SL configuration may include:

SL Identity: an identifier for the SL

List of Linked SL IDs: List of SL identifiers to which this SL is linked. If a radio link issue is declared on any one of these linked SLs, the RRC may take proactive actions on the SL of the current configuration.

SL RLM (S-RLM) configuration: If present, the configuration details the SL radio link monitoring to be performed for the SL of the current configuration. It also provides an indication of the entity that is responsible for making the SL-RLF decision. This decision may be made locally at the peer UEs, or it may be made at the controlling entity. If absent, the RRC may assume that no S-RLM is configured for this SL The S-RLM configuration may be through an SLRadioLinkMonitoringConfig IE. The controlling entity may configure this IE for each SL. For example, for a UE that is in-coverage, the gNB may configure this IE. Alternatively, this IE may be preconfigured. An exemplary version of the IE is shown below in Table 2:

TABLE 2

SLRadioLinkMonitoringConfig information element

```
-- ASN1START
-- TAG-SLRADIOLINKMONITORINGCONFIG-START
SLRadioLinkMonitoringConfig ::=         SEQUENCE {
    failureDetectionTriggersToAddModList   SEQUENCE
(SIZE(1..maxNrofFailureDetectionTriggers)) OF SLRadioLinkMonitoringTriggers
OPTIONAL,   -- Need N
    failureDetectionTriggersToReleaseList SEQUENCE
(SIZE(1..maxNrofFailureDetectionTriggers)) OF SLRadioLinkMonitoringTriggers-Id
OPTIONAL,-- Need N
       SLRadioLinkDecision              ENUMERATED {local, controllingEntity, spare2,
spare1}
       ...
}
SLRadioLinkMonitoringTriggers ::=        SEQUENCE {
    SLRadioLinkMonitoringTriggers-Id        SLRadioLinkMonitoringTriggers-Id,
    triggerTypes                            CHOICE {
       pscch-cnf                               PSCCH-cnf,
       pssch-cnf                               PSSCH-cnf,
       s-ssb-cnf                               S-SSB-cnf,
       harq-cnf                                HARQ-cnf,
       externalSync-cnf                        ExternalSync-cnf,
       MAC-cnf                                   BOOLEAN,
```

TABLE 2-continued

| SLRadioLinkMonitoringConfig information element |
|---|
|     RLC-cnf                                    BOOLEAN,<br>    PDCP-cnf                                 BOOLEAN,<br>    RRC-cnf                                   BOOLEAN,<br>    UpperLayer-cnf                      BOOLEAN,<br>},<br>...<br>}<br>-- TAG-SLRADIOLINKMONITORINGCONFIG-STOP<br>-- ASN1STOPt |

Where the parameters of the IE are described in table 3 below:

TABLE 3

| SLRadioLinkMonitoringConfig field descriptions |
|---|
| SLRadioLinkDecision<br>Entity where the SL RLF decision is made. It may be at the Controlling entity (the gNB or another UE) or locally<br>PSCCH-cnf<br>Configuration for the PSCCH monitoring. Including reporting frequency (when to trigger a measurement report to the RRC)<br>PSSCH-cnf<br>Configuration for the PSSCH monitoring. Including reporting frequency (when to trigger a measurement report to the RRC)<br>S-SSB-cnf<br>Configuration for the S-SSB monitoring. Including reporting frequency (when to trigger a measurement report to the RRC)<br>HARQ-cnf<br>Configuration for the HARQ monitoring. Including when to trigger an indication to the RRC<br>External-Sync-cnf<br>Configuration for the External synchronization source monitoring. Including which sources trigger an indication to the RRC layer if these sources fail.<br>MAC-cnf<br>True indicates that the MAC layer indication should be included as an indication to help determine S-RLF<br>RLC-cnf<br>True indicates that the RLC layer indication should be included as an indication to help determine S-RLF<br>PDCP-cnf<br>True indicates that the PDCP layer indication should be included as an indication to help determine S-RLF<br>RRC-cnf<br>True indicates that a RLF of another radio link layer should be included as an indication to help determine S-RLF<br>upperLayer-cnf<br>True indicates that the Upper layer indication should be included as an indication to help determine S-RLF |

The SL RLM configuration is used to configure the PHY layer measurements or higher layer indications, that may help determine if a SL radio link is poor. In particular, for the PHY layer measurements, the SL RLM configuration provides the metric a UE has to measure, how often this metric has to be reported to the UEs RRC layer, and any thresholds that are used by the PHY layer to monitor changes in this metric. For the higher layer indications, the SL RLM configuration provides whether the higher layer indication is used by the UE or not. These measurements and higher layer indications are sufficient for making a SL RLF decision, in cases where the decision is made at the UE.

In cases, where the S-RLF decision is made by the controlling entity, another layer of configuration may also be needed. This configuration is used to configure what information the UE sends to the controlling entity to assist in making the S-RLF decision. The UE may report any of the PHY layer measurements and higher layer indications that have been configured in the SL RLM configuration. It is proposed that the controlling entity may send a message to the UE to configure what and how the UE reports these PHY layer measurements and higher layer indications to the controlling entity. For example, the controlling entity may select from one or more of the following PHY layer measurements that are maintained by the UEs RRC layer: PSCCH RSRP, PSCCH BLER, RSRQ, RSSI, PSSCH RSRP, SINR, CBR, Channel occupancy, etc.). The controlling entity may select if any layer 3 filtering is required, the reporting frequency of the PHY layer measurement to the controlling entity, any metrics used in the layer 3 filtering of the measurements.

In addition, the controlling entity may select from one or more of the following higher layer indications maintained by the UEs RRC layer: MAC indication, RLC indication, PDCP indication, RRC indication, UpperLayer Indication. The controlling entity configures which of these to report. This reporting period for these indications may be periodic or event driven. The controlling entity may use a modified Measurement Configuration to configure the reporting.

In addition, the RACH common configuration and RLC configuration may be modified as shown in the underlined text below. These new parameters apply exclusively for RACH used on the SL, and RLC-AM radio bearers over a SL (respectively). RACH-ConfigCommon information element is shown in Table 4.

TABLE 4

| RACH-ConfigCommon information element |
|---|
| -- ASN1START<br>-- TAG-RACH-CONFIG-COMMON-START<br>RACH-ConfigCommon ::=           SEQUENCE {<br>    rach-ConfigGeneric            RACH-ConfigGeneric,<br>    totalNumberOfRA-Preambles     INTEGER (1..63)<br>OPTIONAL,  -- Need S<br>    <u>totalNumberOfRA-SLPreambles     INTEGER (1..63)</u><br>OPTIONAL,  -- Need S<br>    ssb-perRach-OccassionAndCB-PreamblesPerSSB   CHOICE {<br>        oneEighth                              ENUMERATED<br>{n4,n8,n12,n16,n20,n24,n28,n32,n36,n40,n44,n48,n52,n56,n60,n64},<br>        oneFourth                              ENUMERATED |

TABLE 4-continued

| RACH-ConfigCommon information element |
|---|

```
{n4,n8,n12,n16,n20,n24,n28,n32,n36,n40,n44,n48,n52,n56,n60,n64},
    oneHalf                    ENUMERATED
{n4,n8,n12,n16,n20,n24,n28,n32,n36,n40,n44,n48,n52,n56,n60,n64},
    one                        ENUMERATED
{n4,n8,n12,n16,n20,n24,n28,n32,n36,n40,n44,n48,n52,n56,n60,n64},
    two                        ENUMERATED {n4,n8,n12,n16,n20,n24,n28,n32},
    four                       INTEGER (1..16),
    eight                      INTEGER (1..8),
    sixteen                    INTEGER (1..4)
  }                                         OPTIONAL,  -
- Need M
  groupBconfigured             SEQUENCE {
    ra-Msg3SizeGroupA              ENUMERATED {b56, b144, b208, b256, b282, b480,
b640,
                                   b800, b1000, b72, spare6, spare5,spare4, spare3, spare2,
spare1},
    messagePowerOffsetGroupB       ENUMERATED { minusinfinity, dB0, dB5, dB8,
dB10, dB12, dB15, dB18},
    numberOfRA-PreamblesGroupA     INTEGER (1..64)
  }                                         OPTIONAL,  -
- Need R
  ra-ContentionResolutionTimer ENUMERATED {sf8, sf16, sf24, sf32, sf40, sf48,
sf56, sf64},
  rsrp-ThresholdSSB                RSRP-Range
OPTIONAL,   -- Need R
  rsrp-ThresholdSSB-SUL            RSRP-Range
OPTIONAL,   -- Cond SUL
  prach-RootSequenceIndex          CHOICE {
    l839                       INTEGER (0..837),
    l139                       INTEGER (0..137)
  },
  msg1-SubcarrierSpacing           SubcarrierSpacing
OPTIONAL,   -- Cond L139Need S
  restrictedSetConfig              ENUMERATED {unrestrictedSet, restrictedSetTypeA,
restrictedSetTypeB},
  msg3 -transformPrecoder          ENUMERATED {enabled}
OPTIONAL,   -- Need R
  ...
}
-- TAG-RACH-CONFIG-COMMON-STOP
-- ASN1STOP
```

RLC-Config information element is shown in Table 5.

TABLE 5

| RLC-Config information element |
|---|

```
-- ASN1START
-- TAG-RLC-CONFIG-START
RLC-Config ::=                CHOICE {
  am                          SEQUENCE {
    ul-AM-RLC                   UL-AM-RLC,
    dl-AM-RLC                   DL-AM-RLC
  },
  um-Bi-Directional           SEQUENCE {
    ul-UM-RLC                   UL-UM-RLC,
    dl-UM-RLC                   DL-UM-RLC
  },
  um-Uni-Directional-UL        SEQUENCE {
    ul-UM-RLC                   UL-UM-RLC
  },
  um-Uni-Directional-DL        SEQUENCE {
    dl-UM-RLC                   DL-UM-RLC
  },
  ...
}
UL-AM-RLC ::=                 SEQUENCE {
  sn-FieldLength               SN-FieldLengthAM           OPTIONAL,  --
Cond Reestab
  t-PollRetransmit             T-PollRetransmit,
  pollPDU                      PollPDU,
  pollByte                     PollByte,
  maxRetxThreshold             ENUMERATED { t1, t2, t3, t4, t6, t8, t16, t32 },
  SLmaxRetxThreshold           ENUMERATED { t1, t2, t3, t4, t6, t8, t16, t32 },
}
```

TABLE 5-continued

| RLC-Config information element |
|---|

```
DL-AM-RLC ::=                   SEQUENCE {
    sn-FieldLength              SN-FieldLengthAM        OPTIONAL,  --
Cond Reestab
    t-Reassembly                T-Reassembly,
    t-StatusProhibit            T-StatusProhibit
}
UL-UM-RLC ::=                   SEQUENCE {
    sn-FieldLength              SN-FieldLengthUM        OPTIONAL   --
Cond Reestab
}
DL-UM-RLC ::=                   SEQUENCE {
    sn-FieldLength              SN-FieldLengthUM        OPTIONAL,  --
Cond Reestab
    t-Reassembly                T-Reassembly
}
T-PollRetransmit ::=            ENUMERATED {
                                ms5, ms10, ms15, ms20, ms25, ms30, ms35,
                                ms40, ms45, ms50, ms55, ms60, ms65, ms70,
                                ms75, ms80, ms85, ms90, ms95, ms100, ms105,
                                ms110, ms115, ms120, ms125, ms130, ms135,
                                ms140, ms145, ms150, ms155, ms160, ms165,
                                ms170, ms175, ms180, ms185, ms190, ms195,
                                ms200, ms205, ms210, ms215, ms220, ms225,
                                ms230, ms235, ms240, ms245, ms250, ms300,
                                ms350, ms400, ms450, ms500, ms800, ms1000,
                                ms2000, ms4000, spare5, spare4, spare3,
                                spare2, spare1}
PollPDU ::=                     ENUMERATED {
                                p4, p8, p16, p32, p64, p128, p256, p512, p1024, p2048, p4096,
p6144, p8192, p12288, p16384, p20480,
                                p24576, p28672, p32768, p40960, p49152, p57344, p65536,
infinity, spare8, spare7, spare6, spare5, spare4,
                                spare3, spare2, spare1}
PollByte ::=                    ENUMERATED {
                                kB1, kB2, kB5, kB8, kB10, kB15, kB25, kB50, kB75,
                                kB100, kB125, kB250, kB375, kB500, kB750, kB1000,
                                kB1250, kB1500, kB2000, kB3000, kB4000, kB4500,
                                kB5000, kB5500, kB6000, kB6500, kB7000, kB7500,
                                mB8, mB9, mB10, mB11, mB12, mB13, mB14, mB15,
                                mB16, mB17, mB18, mB20, mB25, mB30, mB40, infinity,
                                spare20, spare19, spare18, spare17, spare16,
                                spare15, spare14, spare13, spare12, spare11,
                                spare10, spare9, spare8, spare7, spare6, spare5,
                                spare4, spare3, spare2, spare1}
T-Reassembly ::=                ENUMERATED {
                                ms0, ms5, ms10, ms15, ms20, ms25, ms30, ms35,
                                ms40, ms45, ms50, ms55, ms60, ms65, ms70,
                                ms75, ms80, ms85, ms90, ms95, ms100, ms110,
                                ms120, ms130, ms140, ms150, ms160, ms170,
                                ms180, ms190, ms200, spare1}
T-StatusProhibit ::=            ENUMERATED {
                                ms0, ms5, ms10, ms15, ms20, ms25, ms30, ms35,
                                ms40, ms45, ms50, ms55, ms60, ms65, ms70,
                                ms75, ms80, ms85, ms90, ms95, ms100, ms105,
                                ms110, ms115, ms120, ms125, ms130, ms135,
                                ms140, ms145, ms150, ms155, ms160, ms165,
                                ms170, ms175, ms180, ms185, ms190, ms195,
                                ms200, ms205, ms210, ms215, ms220, ms225,
                                ms230, ms235, ms240, ms245, ms250, ms300,
                                ms350, ms400, ms450, ms500, ms800, ms1000,
                                ms1200, ms1600, ms2000, ms2400, spare2, spare1}
SN-FieldLengthUM ::=            ENUMERATED {size6, size12}
SN-FieldLengthAM ::=            ENUMERATED {size12, size18}
-- TAG-RLC-CONFIG-STOP
-- ASN1STOP
```

RRC Control of the Lower Layers

In addition to the per SL S-RLM configuration, the RRC layer at the peer UEs (UE1 and UE2) may provide additional control/functionality to the lower layers. For example, the RRC may:

Provide the starting and/or stopping of the S-RLM. The RRC layer may indicate to the lower layer to start the monitoring. At a later time, it may tell the lower layer to stop the monitoring. For example, the monitoring may be based on the type of traffic that is carried on the SL. If the traffic is of high priority, it may be useful to know when the SL radio link quality is poor, and take some proactive action. In such a case, the S-RLM is enabled for this SL. If at a later time, the SL is carrying low priority traffic, the S-RLM may be stopped.

Provide a list of one or more SLs to monitor. This may be useful for the radio link monitoring based on measurements at the PHY layer. For these, the RRC layer may indicate that the monitoring should be for all observed traffic on the SL resources with a specific (layer 1 source ID, layer 1 destination ID) pair, for all observed traffic on the SL resources to a specific layer 1 destination ID, for all observed traffic on the SL resources from a specific layer 1 source ID, or for all observed traffic on the SL resources.

The RRC may aggregate monitoring requirements from different S-RLM configurations, in order to reduce redundant measurements. For example, SL1 and SL2 may both require PSCCH measurements from the same layer 1 source ID. As a result, the RRC may combine these monitoring requirements and provide a single measurement configuration to the PHY layer.

SL Radio Link Failure Evaluation (SL-RLF)

SL RLF evaluation refers to the procedure whereby a UE evaluates one or more monitored metrics, evaluates whether the radio link quality of the sidelink is satisfactory, and if not, the UE declares a RLF. The UE may perform SL-RLF evaluation always, as is done on the Uu interface. However, this may consume a lot of power at the UE. As an alternative, a UE may throttle when to perform SL-RLF evaluation based on one or more of the following conditions:

- Based on the presence or absence of RLM-AI: the UE may evaluate SL-RLF only when it is monitoring RLM-AI. The UE may know the intervals during which it expects RLM-AI, and perform SL-RLF evaluation only during these periods.
- Based on some radio link monitoring at the UE: The UE may be performing some radio link monitoring in the sidelink. It may start evaluating SL-RLF when monitoring indicates that radio link is starting to degrade. The UE may change the frequency of monitoring, and the metric to monitor. The UE may also start to evaluate if an RLF should be declared based on its monitoring.
- Based on an indication from peer UE, Controlling Entity, Scheduling Entity, gNB, or eNB: The UE may begin SL-RLF evaluation based on an indication from a peer UE, a controlling entity, a scheduling entity, gNB, or eNB. This indication may be via RRC signaling, MAC CEs, DCI, SCI, or combination of RRC, MAC CE, DCI, and SCI.
- Based on type of service: the UE may start SL-RLF evaluation based on the V2X service being supported by the sidelink. For example, for a service requiring high reliability, the UE may perform SL-RLF evaluation. Other services may not require any SL-RLF evaluation—for example these services may rely on the PC5-S keep alive mechanisms. In cases where a UE sidelink has multiple services, the UE may perform SL-RLF evaluation if at least one of these services requires it.
- Based on priority of sidelink information: The UE may start SL-RLF evaluation based on the priority of the logical channel traffic carried on the sidelink. Some sidelink logical channels may not require SL-RLF evaluation while other sidelink logical channels may require SL-RLF evaluation. In cases where a UE has multiple sidelink logical channels, the UE may perform SL-RLF evaluation if at least one of these logical channels requires it.

Declaring S-RLF at the Peer UEs (UE1 or UE2)

Figure 6:
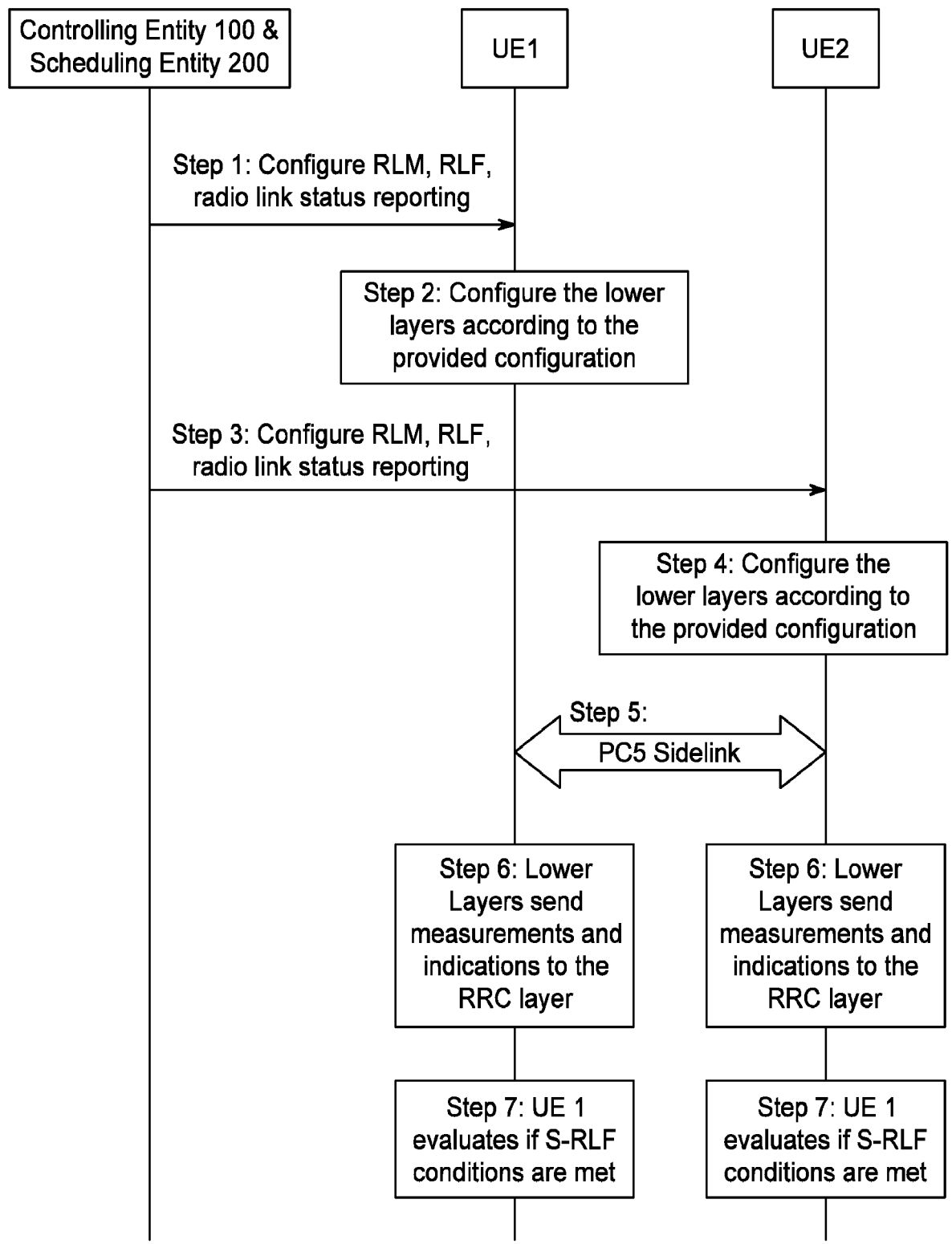
FIG. 6 shows a procedure for declaring SL-RLF at a UE in accordance with an exemplary embodiment.

FIG. 6 shows a procedure for declaring S-RLF at a UE in accordance with an exemplary embodiment. In particular, an overall call flow is shown in FIG. 6, and the steps are described in detail below.

Step 1: Controlling entity 100 configures into the UE1 the RLM, RLF or radio link status reporting control information. In one embodiment such configuration may be provided using RRC signaling. In another embodiment such configuration may be provided through MAC CE, or DCI or combination of RRC, MAC or DCI signaling. In another embodiment, such configuration may be pre-configured in the UE1. For example, this configuration may include the SL RLM (S-RLM) configuration details that specify that:

The peer UEs will make the S-RLF decision

The list of trigger types that will be used for S-RLM

Measurement configuration in support of the RLF detection or radio link status assessment, the reporting configuration for this measurement, including thresholds, reporting periods for these measurements, criterion that triggers UE1 to send a measurement to the RRC, etc. The measurements configuration may include one or more of the following configurations: configuration for measurement quantities related to PHY layer measurements (for e.g. CQI, PDCCH BLER, RSRQ, RSRP, RSSI, SINR, CBR, Channel occupancy, etc.), configuration for measurement related to the protocol stack layers above the PHY, such as MAC layer related measurements for e.g. RACH failures related measurement, measurements related to RLC layer for e.g. number of consecutive RLC NACKs, etc.

Step 2: UE1 configures the lower layers according to the provided S-RLM configuration Step 3: Controlling entity 100 configures into the UE2 the RLM, RLF or radio link status reporting control information.

Step 4: UE2 configures the lower layers according to the provided S-RLM configuration.

Step 5: UE1 and UE2 communicate over the SL. Scheduling information may be provided by a Scheduling entity, or determined autonomously by the peer UEs.

Step 6: The lower layers of UE1 send measurements and indications to the RRC layer. The reporting is controlled by the configuration from Step 1. The following information may be provided to the RRC layer:

Measurement report for one of the layer 1 measurements

Indication that the SL has experienced an issue at one of the layers:

PHY for example due to a loss of synchronization source for the SL,

MAC for example due to a RACH preamble problem

RLC for example due to a number of RLC AM retransmissions,

PDCP for example due to a expiry of the reordering timer,

Upper Layer (PC5-S) for example due to a keep-alive timer expiry.

Indication that the SL may soon experience a problem because one of linked SLs has failed.

Step 7: Based on this information, the RRC may make an S-RLF decision.

The RRC collects all the measurements and indications from the lower layers, and potentially also from the PC5-S layer. Based on the collected information, the RRC layer may declare a S-RLF, or potential S-RLF, and take some action.

In some cases, the RRC may declare an S-RLF, as soon as one of the indications is obtained. For example, this may be the case if:

The indication comes from the MAC layer

The indication comes from the RLC layer

The indication is from the PHY layer and indicates a loss of synchronization (to the GNSS or gNB or sL-SSB of another UE)

In other cases, the RRC may collect measurements or indications and declare RLF after a condition persists. For example, this may be the case if S-RLM is based on:

PSCCH RSRP

PSSCH RSRP

S-SSB RSRP

Hypothetical BLER—estimated from S-SSB and/or CSI-RS

Indication of abnormal HARQ operation (for example, statistics of missing HARQ feedback and HARQ NACK)

In such cases, the RRC may get an indication when an RSRP measurement is below or above a threshold. If the measurement is below a minimum threshold for N312 consecutive times, the RRC starts a T312 timer. The timer is stopped if the measurement is above a minimum threshold for N313 consecutive times. If the timer expires, the RRC declares an S-RLF. To take into account the aperiodic nature of these transmissions on this sidelink, the RRC pauses the timer when the UE does not have ongoing communications on the sidelink (as the UE is not capable of performing RSRP measurements during this time). A similar procedure may be used for the radio link monitoring based in the SL-HARQ failure indications, but the values of the counters and timers may be different to those used for the radio link monitoring based on RSRP.

The following new counters and timers are defined for S-RLM in Tables 6-8.

TABLE 6

| Constant | Usage |
| --- | --- |
| N312 | Maximum number of consecutive RSRP measurements received from the lower layers, that are below the threshold |
| N313 | Maximum number of consecutive RSRP measurements received from the lower layers, that are above the threshold |

TABLE 7

| Counter | Reset | Incremented | When reaching max value |
| --- | --- | --- | --- |
| N312 | Upon reception of indication from lower layers that measurement is below a threshold; | Upon reception of indication from lower layers that measurement is below a threshold while the timer T312 is stopped. | Start timer T312 |
| N313 | Upon reception of indication from lower layers that measurement is above a threshold; | Upon reception of indication from lower layers that measurement is above a threshold while the timer T312 is stopped. | Stop the timer T312 |

TABLE 8

| Timer | Start | Stop | Pause | Resumed | At expiry |
| --- | --- | --- | --- | --- | --- |
| T312 | Upon detecting physical layer problems on a SL i.e. upon receiving N312 consecutive indications from lower layers that measurement is below a threshold | Upon receiving N313 consecutive indications from lower layers that measurement is above a threshold for the SL | Upon determining that there is no activity on the SL that triggered the timer | Upon determining that activity has resumed in the SL that triggered the timer | Declare a S-RLF for the SL that triggered the timer |

In yet another case, the RRC may collect measurements or indications and declare a potential S-RLF after a condition persists. For example, this may be the case if S-RLM is based on an indication from the PC5-S layer that a keep-alive timer for the SL has expired.

Actions after declaration of S-RLF or potential S-RLF

Alternative 1: Tear down the radio bearer associated with the SL

In this first alternative, the RRC layer removes the radio bearer configuration associated with the SL. The UE may start a timer (T315) and try to re-establish a SL connection with the peer UE. If the timer expires before the SL is re-established, the UE clears the S-RRC between the two UEs The overall procedure is described below in a typical embodiment:

Detection of SL Radio Link Failure

The UE shall:

1> upon T312 expiry for SL; or
1> upon receiving an externalSync indication from the PHY, or
1> upon random access problem indication for this SL from MAC while T312 is not running; or
1> upon indication from RLC of a S-RLF caused by an RLC issue:
1> Upon determining that this SL is linked to a SL for which a S-RLF has been declared:
2> consider SL radio link failure to be detected for the SL i.e. S-RLF;
2> start timer T315
2> Try to re-establish connection to the SL peer UE (for example send a RACH to the peer UE, or send a MAC PDU to verify reception on HARQ feedback)

SL Communication Re-Established

The UE shall:

1> upon determining that the SL communication to the peer UE is re-established (for example the peer has sent a HARQ ACK/NACK):
2> Stop timer T315.

Expiry of Timer T315:

The UE shall:

1> upon expiry of timer T315:
2> Remove all data radio bearers associated to the SL connection,
2> Remove the S-RRC context related to the SL connection
2> Determine the SLs that are linked to the SL that has failed (using the information in the SL Configuration). For each of these SLs, declare an S-RLF, and repeat the current procedure.

Alternative 2: Move the SL to different Resource Pool

In this second alternative, the RRC layer autonomously moves the SL connection to another resource pool. Recall that SL communication are enabled over resource pools that may be configured by the controlling entity, or pre-configured into the UE. The RRC layer may know the available resource pools based on the configuration from the PC5, or through the SL RRC connection setup procedure. Once a S-RLF is declared, the UE may reconfigure the RBs to use the new resource pool.

The overall procedure is described below in a typical embodiment:

Detection of SL radio link failure

The UE shall:
1> upon T312 expiry for SL; or
1> upon receiving an externalSync indication from the PHY, or
1> upon random access problem indication for this SL from MAC while T312 is not running; or
1> upon indication from RLC of a S-RLF caused by an RLC issue:
1> upon determining that this SL is linked to a SL for which a S-RLF has been declared:
   2> consider SL radio link failure to be detected for the SL i.e. S-RLF;
   2> determine another potential resource pool for the peer UEs;
   2> If an alternate resource pool exists:
      3> Reconfigure all radio bearers on this SL, to use this new resource pool,
      3> Send a SLRRCReconfigurationRequest Message to the peer UE, to inform the peer UE that the S-RRC connection and radio bearers have been transferred to this new resource pool. This message may include a S-RRC identifier, and zero or more radio bearer identifiers.
   2> else:
      3> Remove all the radio bearers on this SL, and remove any S-RRC context associated with this SL.
      3> Determine the SLs that are linked to the SL that has failed (using the information in the SL Configuration). For each of these SLs, declare an S-RLF, and repeat the current procedure.

Alternative 3: Move the SL to a different band

In this third alternative, the RRC layer autonomously moves the SL connection to another resource pool in a different band—provided that both UEs support the other band. The RRC layer may know the band support of the peer UE, as a result of a capability exchange between the 2 UEs. This capability exchange may be performed during S-RRC connection establishment, or after S-RRC connection establishment. Once a S-RLF is declared, the UE may reconfigure the RBs to use the new resource pool on the new band.

The overall procedure is described below in a typical embodiment:

Detection of SL radio link failure

The UE shall:
1> upon T312 expiry for SL; or
1> upon receiving an externalSync indication from the PHY, or
1> upon random access problem indication for this SL from MAC while T312 is not running; or
1> upon indication from RLC of a S-RLF caused by an RLC issue
1> upon determining that this SL is linked to a SL for which a S-RLF has been declared:
   2> consider SL radio link failure to be detected for the SL i.e. S-RLF;
   2> determine another potential operating band for the peer UEs;
   2> If the peer UEs share another potential operating band:
      3> Reconfigure all radio bearers on this SL, to this new band,
      3> Send a SLRRCReconfigurationRequest Message to the peer UE, to inform the peer UE that the S-RRC connection and radio bearers have been transferred to this new band. This message may include a S-RRC identifier, and zero or more radio bearer identifiers.
   2> else:
      3> Remove all the radio bearers on this SL, and remove any S-RRC context associated with this SL.
      3> Determine the SLs that are linked to the SL that has failed (using the information in the SL Configuration). For each of these SLs, declare an S-RLF, and repeat the current procedure.

Alternative 4: Notify the Upper layers (PC5-S)

In this fourth alternative, the RRC layer notifies the Upper Layers (PC5-S) that a S-RLF has been declared. This message may include an indication of the SL connection. It may also provide an indication as to the cause of the S-RLF. The Upper Layer may perform one or more of the following:
order discovery of another peer UE with which the SL communication service may continue;
Select another peer UE with which the SL communication service may continue;
Change of the parameters of the current SL connection;
Tear down/release the sidelink;

The overall procedure is described below in a typical embodiment:

Detection of SL radio link failure

The UE shall:
1> Upon T312 expiry for SL; or
1> Upon receiving an externalSync indication from the PHY, or
1> Upon random access problem indication for this SL from MAC while T312 is not running; or
1> Upon indication from RLC of a S-RLF caused by an RLC issue:
1> Upon determining that this SL is linked to a SL for which a S-RLF has been declared:
   2> Consider SL radio link failure to be detected for the SL i.e. S-RLF;
   2> Notify the Upper Layers about the failed SL. This may include some identification of the SL connection, as well as cause for the failure between the peer UEs,
   2> Start timer T316 and wait for response from Upper Layers.

Expiry of Timer T316:

The UE shall:
1> upon expiry of timer T315:
   2> Remove all data radio bearers associated to the SL connection,
   2> Remove the S-RRC context related to the SL connection
   2> Determine the SLs that are linked to the SL that has failed (using the information in the SL Configuration). For each of these SLs, declare an S-RLF, and repeat the current procedure.

Reception of Response from Upper Layers
The UE shall:
1> If the response indicates that the SL should be removed:
2> Remove all data radio bearers associated to the SL connection,
12> Remove the S-RRC context related to the SL connection
1> Else if the response indicates a new configuration for the SL:
2> Change the configuration of the SL
2> Reconfigure all radio bearers on this SL, with this new configuration,
2> Optionally, send a SLRRCReconfigurationRequest Message to the peer UE, to inform the peer UE that the S-RRC connection and radio bearers have been transferred to this new configuration. This message may include a S-RRC identifier, and zero or more radio bearer identifiers.
1> Else if the response indicates a new discovery request:
2> Perform the discovery of a new peer UE,
1> Else if the response indicates to change the peer UE
2> start a SL connection to the new peer UE,
2> transfer all radio bearers to the new peer UE, Alternative 5: Notify the Controlling Entity In this fifth alternative, the UE RRC layer sends a message to the Controlling entity to indicate that the SL radio link has failed. The UE may also send an indication of the cause of the failure (PHY issue, MAC issue, etc.) as well as the identity of the peer UE. The message may be sent by a RRC, MAC CE, or DCI, or combination of RRC, MAC CE, or DCI). In response, the controlling entity may:
Notify the scheduling entity to reduce/stop/eliminate any configured grants to UEs impacted by the S-RLF
Notify the scheduling entity to stop scheduling the UEs impacted by the S-RLF notify the scheduling entity to change the grant allocation to the UEs impacted by the S-RLF
configure the SL on a new resource pool
configure the SL on a new band and resource pool
Send a message to all UEs impacted by the failed SL to notify these that an RLF has been declared for the SL. This message may contain information to help the impacted UEs identify the failed SL—for example: an identifier for the SL, the layer 1 Source ID, the layer 1 destination ID. The message may be sent by RRC, MAC CE, or DCI, or combination of RRC, MAC CE, and DCI. The message may be destined to the Upper Layer of the impacted UEs.

The overall procedure is described below in a typical embodiment:

Detection of SL Radio Link Failure
The UE shall:
1> Upon T312 expiry for SL; or
1> Upon receiving an externalSync indication from the PHY, or
1> Upon random access problem indication for this SL from MAC while T312 is not running; or
1> Upon indication from RLC of a S-RLF caused by an RLC issue:
1> Upon determining that this SL is linked to a SL for which a S-RLF has been declared:
2> Consider SL radio link failure to be detected for the SL i.e. S-RLF;
2> Send a SLStatus message to the controlling entity (for example the gNB).This may include some identification of the SL connection, the cause for the failure of the sidelink, and the identity of the peer UE.

Alternative 6: Use the Uu Interface to Replace the SL

In this sixth option, when the RRC declares a S-RLF, and if both UEs are in coverage, then the radio bearers are transferred to the Uu interface and all communication between UE1 and UE2 go through the gNB. This may be used when the peer UEs are not able to re-establish another sidelink connection and if the latency requirement will still be met. The SL configuration may have an option to denote if the SL can be transferred to the Uu.

Figure 7A:
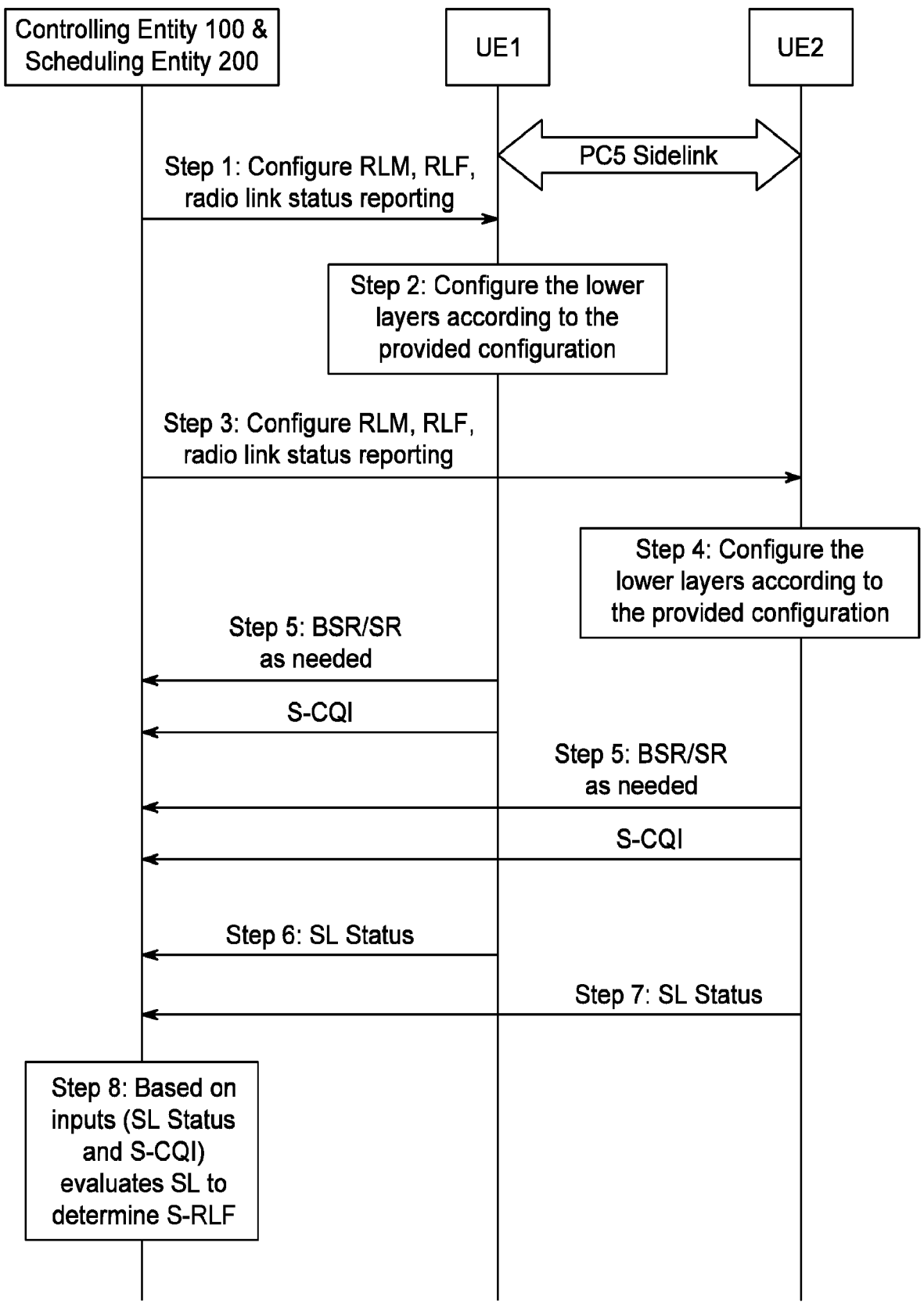
FIG. 7A shows a procedure for declaring SL-RLF at a controlling entity in accordance with an exemplary embodiment.

The overall procedure is described below in a typical embodiment:

Detection of SL radio link failure
The UE shall:
1> upon T312 expiry for SL; or
1> upon receiving an externalSync indication from the PHY, or
1> upon random access problem indication for this SL from MAC while T312 is not running; or
1> upon indication from RLC of a S-RLF caused by an RLC issue:
1> Upon determining that this SL is linked to a SL for which a S-RLF has been declared:
2> consider SL radio link failure to be detected for the SL i.e. S-RLF;
2> If the SL connection is allowed to be transferred to the Uu interface, the UE shall:
3> Initiate an RRC Connection establishment procedure with the network, if no RRC connection exists,
3> Initiate an RRC reconfiguration procedure to transfer the radio bearers of the SL to the gNB.
2> else
3> Remove all data radio bearers associated to the SL connection,
3> Remove the S-RRC context related to the SL connection Declaring S-RLF at the Controlling/Scheduling Entity FIG. 7A shows a procedure for declaring S-RLF at a controlling entity 100 in accordance with an exemplary embodiment. In particular, the overall call flow is shown in FIG. 7A, and the steps are described in detail below.

Step 1: Controlling entity 100 configures into the UE the RLM, RLF or radio link status reporting control information. In one embodiment such configuration may be provided using RRC signaling. In another embodiment such configuration may be provided through MAC CE, or DCI and combination of RRC, MAC or DCI signaling. In another embodiment, such configuration may be pre-configured in the UE. For example, this configuration may include SL RLM (S-RLM) configuration details that specify that:
The controlling entity 100 will make the S-RLF decision
The list of trigger types that will be used for S-RLM
Measurement configuration in support of the RLF detection or radio link status assessment, the reporting configuration for this measurement, including thresholds, reporting periods for these measurements, criterion that triggers UE1 to send a measurement to the controlling entity 100, etc. The measurements configuration may include one or more of the following configurations: configuration for measurement quantities related to PHY layer measurements (for e.g. CQI, PDCCH BLER, RSRQ, RSRP, RSSI, SINR, CBR, Channel occupancy, etc.), configuration for measurement related to the protocol stack layers above the PHY, such as MAC layer related measurements for e.g. RACH failures related measurement, measurements related to RLC layer from e.g. number of consecutive RLC NACKs, etc.

Step 2: UE1 configures the lower layers according to the provided S-RLM configuration Step 3: Same as Step 1 but for UE2

Step 4: Same as Step 2 but for UE2

Step 5: UE1 and UE2 communicate over the SL. Scheduling is provided through the scheduling entity. The scheduling entity may use BSR/SR from the UEs to determine the amount of resources to assign to each UE, and it may use the S-CQI reported from these UEs to determine the MCS for these SL transmissions.

Step 6: UE1 sends SL status messages to the controlling entity 100. These messages are sent according to the reporting frequency configured in the S-RLM configuration. These messages may include one or more of:

Measurement report for one of the layer 1 measurements

Indication that the SL has experienced an issue at one of the layers:

PHY for example due to a loss of synchronization source for the SL,

MAC for example due to a RACH preamble problem

RLC for example due to a number of RLC AM retransmissions,

PDCP for example due to a expiry of the reordering timer,

Upper Layer (PC5-S) for example due to a keep-alive timer expiry.

Indication that the SL may soon experience a problem because one of linked SLs has failed.

Indication that the UE1 has declared the SL radio link has failed

Note that the status message may be sent as an RRC message, or MAC CE message or DCI message or a combination of RRC, MAC CE or DCI message.

Step 7: UE2 sends SL status messages to the controlling entity 100.

Step 8: Based on these status messages and the S-CQI information from the UEs, the controlling entity 100 may make an S-RLF decision.

Actions After Declaration of S-RLF

Once the controlling entity 100 declares a S-RLF it may:

Notify the peer UEs that the SL has undergone an RLF. It may send a message to these UEs, with an indication that the SL has an RLF. UE1 and UE2 would then follow the steps provided in Section dealing with Declaring S-RLF at the Peer UEs (UE1 or UE2)

Notify the peer UEs that the SL has undergone an RLF. It may send a message to these UEs, with a request to tear down all radio bearers associated with the SL and to remove the S-RRC context related to the SL connection.

Determine an alternate resource pool for the failed sidelink. It may send a message to these UEs, with the configuration of the new resource pool.

Determine an alternate band and resource pool for the failed sidelink. It may send a message to these UEs, with the configuration of the new operating band and resource pool, Notify the peer UEs that they should inform their Upper Layer that the SL is no longer viable. The Upper Layer may perform one or more of the following:

order discovery of another peer UE with which the SL communication service may continue;

Select another peer UE with which the SL communication service may continue;

Change of the parameters of the current SL connection;

Tear down/release the sidelink;

Notify UE1 and UE2 that it will act as a bridge/relay between the two UEs. It may send a message to these UEs, with a request to transfer the radio bearers from the failed SL.

Note that the message to the peer UEs may be sent as an RRC message, or MAC CE message or DCI message or a combination of RRC, MAC CE or DCI message. In one embodiment of an RRC message, the controlling entity 100 may use an RRCReconfiguration message.

Procedure for Sidelink Groupcast Link Monitoring

A groupcast is made up of multiple radio links between all the members of the group. Each of the group members may initiate a groupcast communication destined to all the other members of the group. In some cases, the group will have a group leader, for example a platoon leader in the V2X platoon scenario. As the leader, this group member may initiate more groupcast communications than the other members.

Radio link problems at one group member is not an indication of poor radio link at the other group members. As a result, the notion of groupcast link failure needs to be defined.

In one approach the group may be defined with:

A minimum viable number: if the controlling entity 100 determines that the group has fewer than this number of UEs then a groupcast link failure is declared A set of one or more anchor group members. An anchor member is a special member which is required for proper group operation. For example, the anchor member may be a vehicle with specialized sensors. If this member leaves the group, or loses connectivity to the group, the group will not have these specialized sensor readings and should be disbanded. If controlling entity 100 determines that one of these members is not in the group, then a groupcast link failure is declared.

Access Stratum Keep Alive Exchange

One of the proposed RLM-AI types is an Access Stratum Keep Alive mechanism. In this section we show how this keep alive mechanism may be implemented at various layers of the Access Stratum protocol stack.

The keep alive procedure may be used:

Between the UEs communicating in the sidelink

Between the Scheduling entity and a UE for which it is performing scheduling decisions Between the Controlling entity and a UE for which it is providing radio resource control.

RRC Layer Keep Alive Procedure

The RRC layer of a UE may use a keep alive procedure to assist in determining if a sidelink is still viable.

In the following, it is assumed that UE1 initiates the keep alive procedure and UE2 is the peer UE in the sidelink. It should be understood that similar steps may also occur with UE2 as the initiator of the keep alive procedure and UE1 is the peer UE in the sidelink.

Figure 7B:
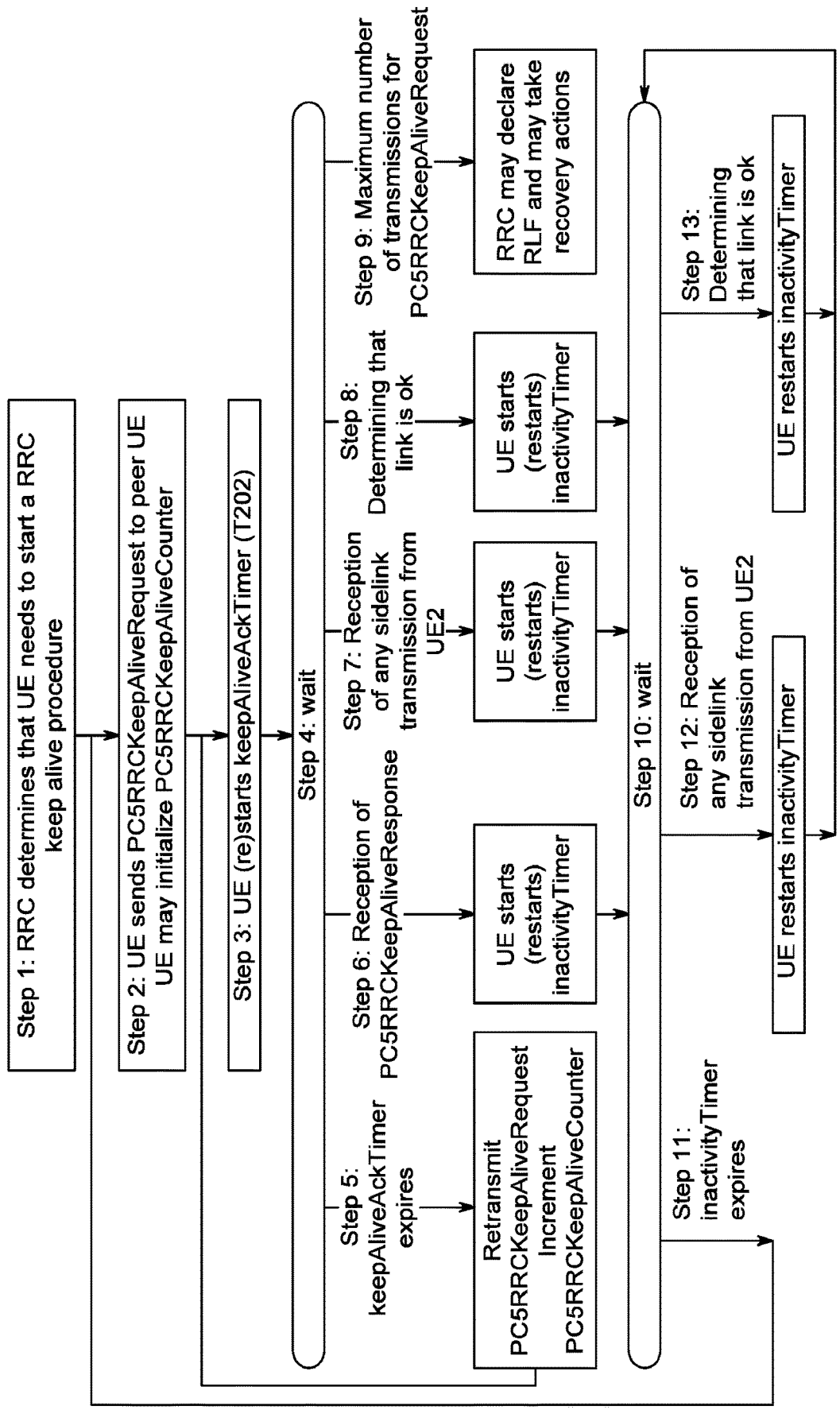
FIG. 7B shows a keep alive procedure performed by a first UE.

The keep alive procedure at UE1 and illustrated in FIG. 7B is described below.

Step 1: RRC determines that UE1 needs to start the RRC keep alive procedure. RRC may start/stop the RRC keep alive procedure. In a first option, the RRC starts the keep alive procedure during or immediately following the PC5 RRC connection establishment procedure, and may stop the procedure when the PC5 RRC connection is released. In a second option the RRC starts the keep alive procedure based on some monitored metrics, and perhaps an assessment that the sidelink radio quality is degrading. In this second option, the RRC may stop the keep alive procedure based on some monitored metric, and perhaps an assessment that the sidelink radio quality is good. Note that the two options may also be combined. For example, starting the keep alive procedure at the PC5 RRC establishment, and stopping keep alive procedure if the link is deemed to be good.

Step 2: UE1 generates a new PC5 RRC message (PC5RRCKeepAliveRequest) to UE2. PC5RRCKeepAliveRequest may include an IE:maxInactivityTimer. This IE denotes UE1's maximum inactivity time. This may be used by UE2 to judge how long it needs to wait before declaring that there is a problem on the sidelink to UE1. UE1 may also initialize a PC5RRCKeepAliveCounter.

Step 3: UE1 may (re)start a keepAliveAckTimer (T202).

Step 4: Wait for either: T202 timer to expire (Step 5); reception of a PC5RRCKeepAliveResponse from UE2 (Step 6), reception of an indication from the PHY layer or MAC layer that UE1 has received sidelink transmission from UE2 (Step 7); determination from RRC that the sidelink to UE2 is still acceptable (Step 8); determination that PC5RRCKeepAliveResponse has been retransmitted a maximum number of times (Step 9)

Step 5: Upon expiry of T202 timer, UE1 retransmits the PC5RRCKeepAliveRequest message. UE1 may also increment PC5RRCKeepAliveCounter. Processing returns to Step 3.

Step 6: Upon reception of a PC5RRCKeepAliveResponse from UE2, UE1 may stop keepAliveAckTimer (T202), and may start inactivityTimer (T200). UE1 continues to Step 10.

Step 7: Upon reception of any sidelink transmissions from UE2, UE1 may stop keepAliveAckTimer (T202), and may start inactivityTimer (T200). UE1 continues to Step 10.

Step 8: Upon determination that sidelink to UE2 is still acceptable, UE1 may stop keepAliveAckTimer (T202), and may start inactivityTimer (T200). UE1 continues to Step 10.

Step 9: If RRC determines that PC5RRCKeepAliveCounter equals maxPC5RRCKeepAliveTx, RRC stops keepAliveAckTimer (T202), and may declare a Radio Link Failure. UE1 may then take one or more recovery actions. Processing stops here.

Step 10: Wait for either: T200 timer to expire (Step 11); reception of an indication from the PHY layer or MAC layer that UE1 has received sidelink transmission from UE2 (Step 12); determination from RRC that the sidelink to UE2 is still acceptable (Step 13).

Step 11: Upon expiry of T200 timer, UE1 returns to Step 2.

Step 12: Upon reception of any sidelink transmissions from UE2, UE1 may restart inactivityTimer (T200). UE1 returns to Step 10.

Step 13: Upon determination that sidelink to UE2 is still acceptable, UE1 may restart inactivityTimer (T200). UE1 returns to Step 10.

Figure 7C:
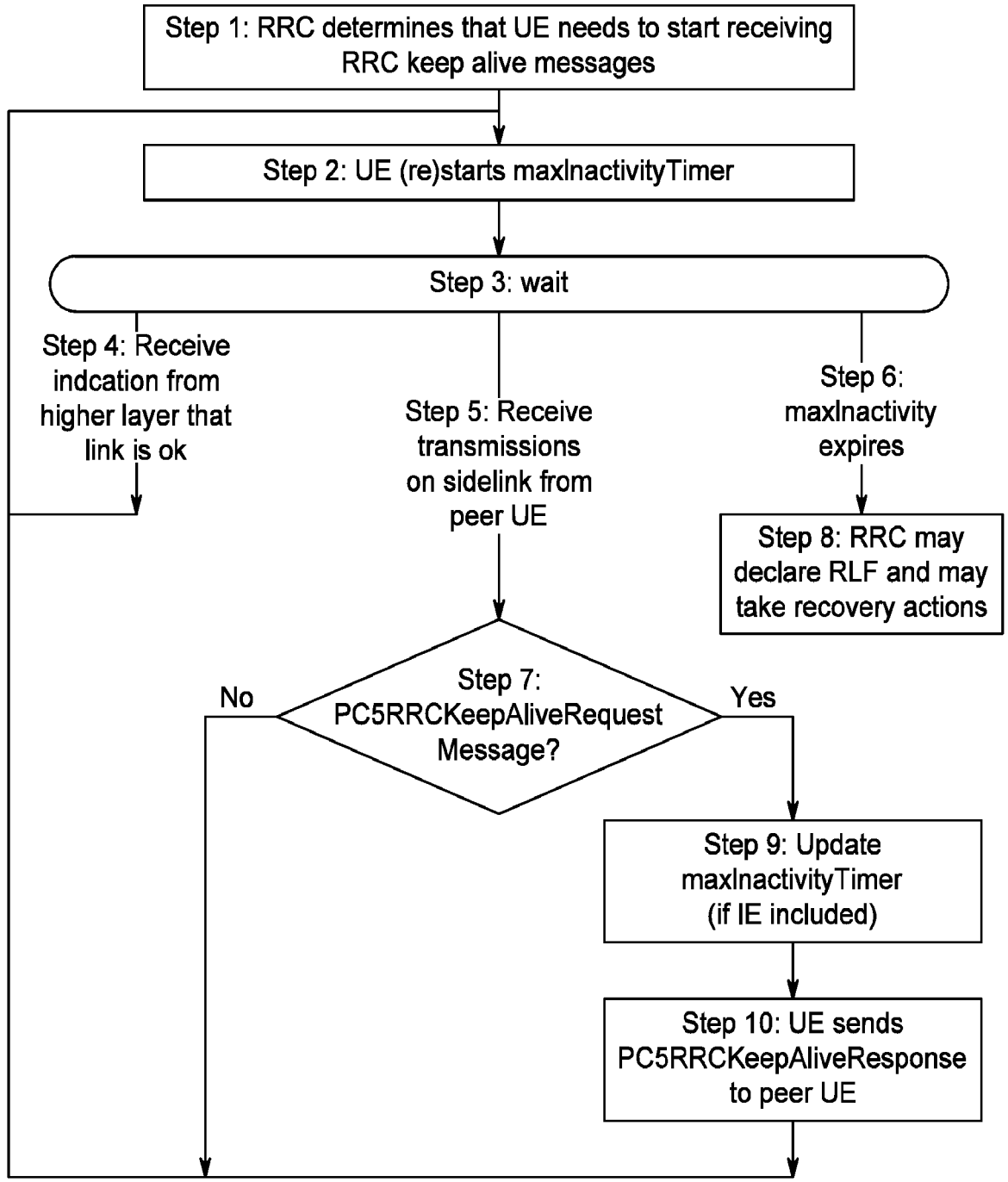
FIG. 7C shows a keep alive procedure performed by a second UE.

The keep alive procedure at UE2 is illustrated FIG. 7C and described below.

Step 1: RRC determines that UE2 needs to start reception of RRC keep alive messages.

Step 2: UE2 (re)start a maxInactivityTimer (T201).

Step 3: Wait for either: T201 timer to expire (Step 6); reception of a PC5RRCKeepAliveResponse from UE2 (Step 6), reception of an indication from the PHY layer or MAC layer that UE2 has received sidelink transmission from UE1 (Step 5); determination from RRC that the sidelink to UE1 is still acceptable (Step 4), Step 4: Upon determination that sidelink to UE1 is still acceptable, UE2 returns to Step 2.

Step 5: Upon reception of any sidelink transmissions from UE1, UE2 determines if the message received is PC5RRCKeepAliveRequest (Step 7). If the message received is an PC5RRCKeepAliveRequest and it includes IE:maxInactivityTimer, UE2 may update the maxInactivityTimer (Step 9). Furthermore, UE2 may respond to UE1 with a new RRC message (PC5RRCKeepAliveResponse) (Step 10).

Step 6: Upon expiry of T201 timer, RRC may declare a Radio Link Failure at Step 8. UE2 may then take one or more recovery actions. Processing stops here.

MAC Layer Keep Alive Procedure

The MAC layer of a UE may use a keep alive procedure to assist in determining if a sidelink is still viable.

In the following, it is assumed that UE1 initiates the keep alive procedure and UE2 is the peer UE in the sidelink. It should be understood that similar steps may also occur with UE2 as the initiator of the keep alive procedure and UE1 is the peer UE in the sidelink. Also, in the following we refer to Higher Layer(s). This may be understood as any layer above the MAC. For example, the RRC layer or the NAS layer.

Figure 7D:
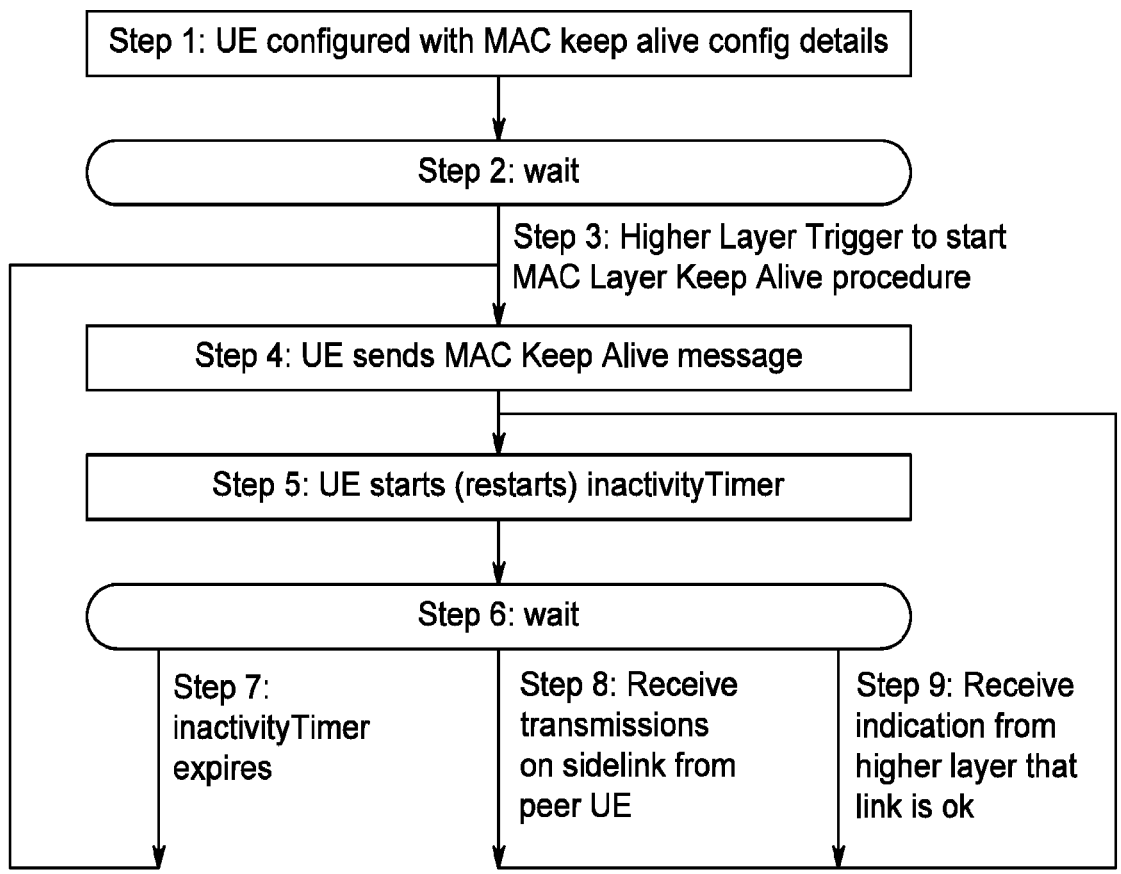
FIG. 7D shows a first alternative procedure performed by a first UE.

One option for the procedure at UE1 is illustrated in FIG. 7D, and described below.

Step 1: UE1 is configured with MAC keep alive configuration details.

Step 2: UE1 waits for indication from higher layers to start MAC keep alive procedure. Higher layers may start/stop the MAC keep alive procedure. In a first option, the higher layer starts the keep alive procedure during or immediately following the PC5 RRC connection establishment procedure, and may stop the procedure when the PC5 RRC connection is released. In a second option the higher layer starts the keep alive procedure based on some monitored metrics, and perhaps an assessment that the sidelink radio quality is degrading. In this second option, the higher layer may stop the keep alive procedure based on some monitored metric, and perhaps an assessment that the sidelink radio quality is good. Note that the two options may also be combined. For example, starting the keep alive procedure at the PC5 RRC establishment, and stopping keep alive procedure if the link is deemed to be good.

Step 3: Higher layers in UE1 triggers start of the MAC keep alive procedure. Go to step 4

Step 4: UE1 sends a MAC keep alive message. UE1 may generate the message as a as new MAC CE. The MAC CE may be a "Keep Alive MAC CE". The MAC CE may include an indication of UEl's maximum inactivity time (MaximumInactivityTime). This may be used by UE2 to judge how long it needs to wait before informing its upper layer that it has detected a problem on the sidelink to UE1. The new MAC CE may have a new logical channel ID (Table 9):

TABLE 9

Values of LCID for UL-SCH

| Index | LCID values |
|---|---|
| 0 | CCCH of size 64 bits (referred to as "CCCH1" in TS 38.331 [5]) |
| 1-32 | Identity of the logical channel |
| 33-51 | Reserved |
| 52 | CCCH of size 48 bits (referred to as "CCCH" in TS 38.331 [5]) |
| 53 | Recommended bit rate query |
| 54 | Multiple Entry PHR (four octets $C_i$) |

TABLE 9-continued

Values of LCID for UL-SCH

| Index | LCID values |
|---|---|
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |
| 64 | Keep Alive |

During Logical Channel Prioritization, this new MAC CE may have higher priority than transmissions on other SLs. This new MAC CE may also have higher priority than some transmissions on the Uu interface. Processing than continues with Step 5

Step 5: UE1 may start (or restart) an inactivityTimer (T100). Goto Step 6.

Step 6: Wait for either: T100 timer to expire (Step 7), receive any sidelink transmission from UE2 (Step 8), on receive an indication from higher layer (Step 9)

Step 7: Upon expiry of T100 timer, UE1 returns to Step 4.

Step 8: Upon receiving any transmission on the sidelink from UE2, UE1 returns to Step 5.

Step 9: Upon receiving an indication from higher layer that the sidelink quality is acceptable, UE1 returns to Step 5. The higher layer may provide an indication if it has made one or more measurements from UE2 transmissions. These measurements may be made from any of the UE2 transmissions, including:

sidelink from UE2 to UE1,
other sidelinks (from UE2 to other UEs),
on the uplink from UE2 to its serving gNB or eNB From these measurements the higher layer may assess that the quality of the link from UE2 is acceptable.

Note that at any time from Step 3 onward, the MAC layer may receive an indication from higher layers to stop MAC keep alive procedure. In such a case, the processing returns to Step 2.

Figure 7E:
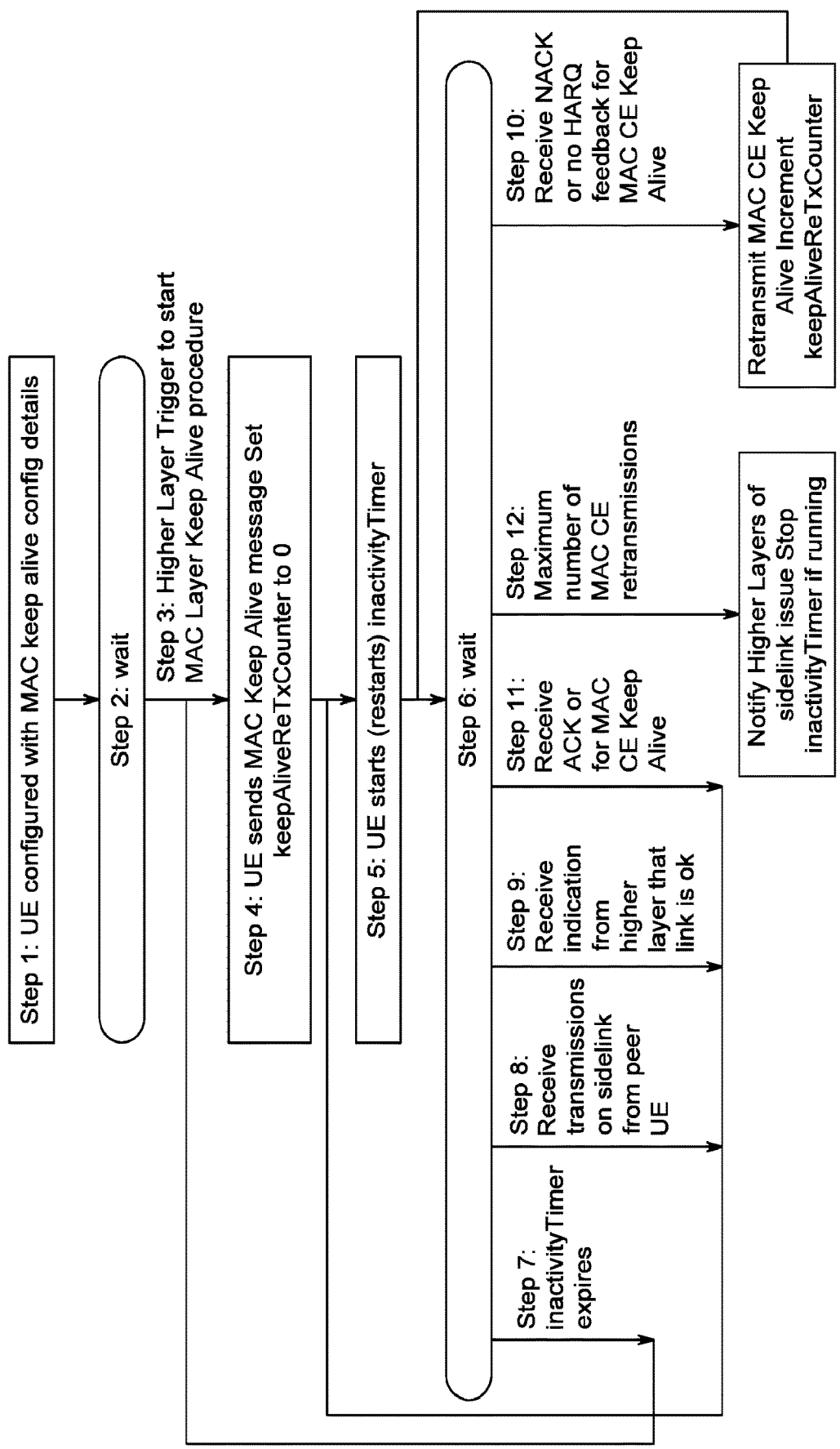
FIG. 7E shows a second alternative procedure performed by a first UE.

A second option for the procedure at UE1 is illustrated in FIG. 7E and described below.

Step 1: UE1 is configured with MAC keep alive configuration details.

Step 2: UE1 waits for indication from higher layers to start MAC keep alive procedure.

Step 3: Higher layers in UE1 triggers start of the MAC keep alive procedure. Go to step 4

Step 4: UE1 sends a MAC keep alive message. UE1 may generate the message as a as new MAC CE with a new logical channel ID. UE1 initializes a keepAliveReTx-Counter Processing than continues with Step 5.

Step 5: UE1 may start (or restart) an Inactivity Timer (T100). Goto Step 6.

Step 6: Wait for either: T100 timer to expire (Step 7), receive any sidelink transmission from UE2 (Step 8), receive an indication from higher layer (Step 9), receive a NACK or no HARQ feedback to the MAC CE keep alive transmission (Step 10), Receive an ACK to the MAC CE keep alive transmission (Step 11), maximum number of retransmission attempts made (Step 12).

Step 7: Upon expiry of T100 timer, UE1 returns to Step 4.

Step 8: Upon receiving any transmission on the sidelink from UE2, UE1 returns to Step 5.

Step 9: Upon receiving an indication from higher layer that the sidelink quality is acceptable, UE1 returns to Step 5.

Step 10: Upon receiving a NACK, or not receiving any HARQ feedback, for the MAC CE keep alive transmission, retransmit the MAC CE keep alive message and increment the KeepAliveReTxCounter. Return to Step 6.

Step 11: Upon receiving an ACK for the MAC CE keep alive transmission, UE1 returns to Step 5.

Step 12: Upon retransmitting the MAC CE keep alive message a maximum number of times (maxKeepAliveReTxCounter), the MAC layer signals to the higher layer that an issue with the sidelink between UE1 and UE2 has been detected. This may include a cause for the signal (e.g. maximum number keep alive retransmissions). UE1 may also stop/reset inactivityTimer, if running.

Note that at any time from Step 3 onward, the MAC layer may receive an indication from higher layers to stop MAC keep alive procedure. In such a case, the processing returns to Step 2.

Figure 7F:
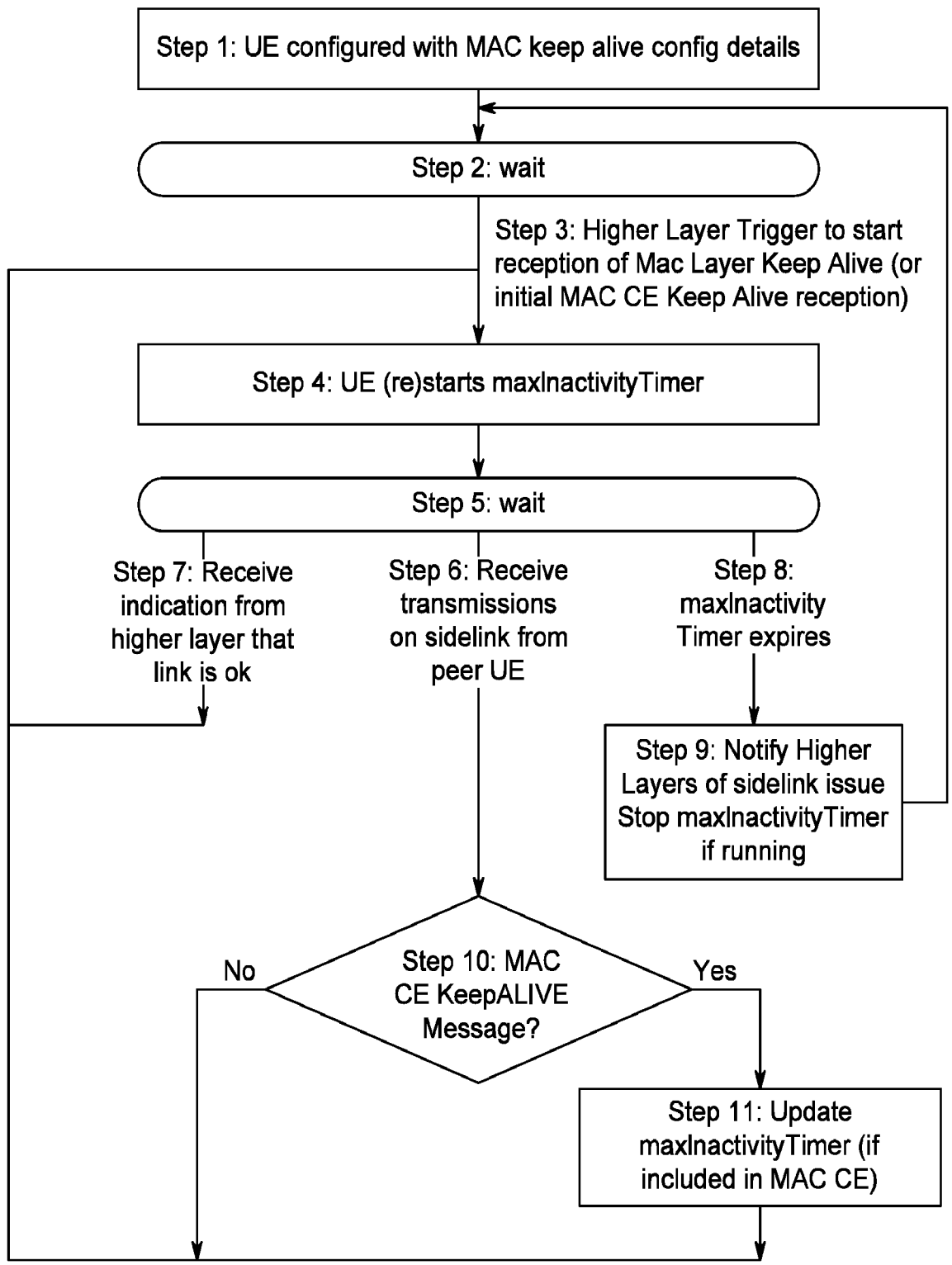
FIG. 7F shows a first alternative procedure performed by a second UE.

A procedure at UE2 is illustrated in FIG. 7F and described below.

Step 1: UE2 is configured with MAC keep alive configuration details.

Step 2: UE2 waits for an indication to start reception of MAC keep alive messages from UE1. This may be an indication from higher layers at UE2. Alternatively, this may be the reception of a first MAC CE Keep Alive message from UE1. This message may contain a maxInactivityTimer (T101) value.

Step 3: Higher layers in UE2 triggers MAC to start reception of the MAC keep alive messages. Alternatively, UE2 receives a first MAC CE Keep Alive message from UE1 and this triggers MAC to start reception of the MAC keep alive message. Go to step 4

Step 4: UE2 starts (restarts) maxInactivityTimer (T101) for the sidelink between UE1 and UE2. Note that it is assumed that UE2 knows the maxInactivityTimer for the sidelink communication to UE1. This may be known to UE2 higher layer as part of the PC5 RRC connection establishment procedure and provided to UE2 in Step 1. Alternatively, UE1 may provide this information as part of the MAC CE Keep Alive message.

Step 5: Wait for either: receive any sidelink transmission from UE1 (Step 6), receive an indication from higher layer (Step 7), maxInactivityTimer (T101) timer to expire (Step 8).

Step 6: Upon receiving any transmission on the sidelink from UE2, UE1 determines whether the reception includes a MAC CE Keep Alive message with a new maxInactivityTimer (T101) (Step 10). If not, UE1 returns to Step 4. If so, then the timer value is updated in UE2 (Step 11).

Step 7: Upon receiving an indication from higher layer that the sidelink quality is acceptable, UE1 returns to Step 4.

Step 8: Upon expiry of T101 timer, the MAC layer notifies/signals to the higher layer that an issue with the sidelink between UE1 and UE2 has been detected (Step 9). This may include a cause for the signal (e.g. sidelink inactivity exceeds maximum). UE1 returns to Step 2.

Note that at any time from Step 3 onward, the MAC layer may receive an indication from higher layers to stop MAC keep alive procedure. In such a case, the processing returns to Step 2.

Based on the flowcharts of FIGS. 7D-7F, the UEs may be configured with the following parameters for the keep alive mechanism:

inactivityTimer (T100): MAC keep alive timer: Timer denoting interval between MAC layer keep alive transmissions, if no activity is observed on the sidelink.

maxInactivityTimer (T101): Maximum time receiving UE should wait before declaring that there may be an issue with the sidelink. It may be provided by the peer UE (in RRC connection establishment message or in MAC CE Keep Alive message)

maxKeepAliveReTxCounter: Maximum number of times a UE may transmit the MAC CE Keep Alive message before declaring that there may be an issue with the sidelink.

An exemplary embodiment of the present disclosure provides an apparatus configured to monitor a sidelink (SL) connection. The apparatus comprises processing circuitry configured to receive signals in a protocol stack to perform SL-radio link monitoring (SL-RLM), and determine, according to the signals, whether a SL-radio link failure (RLF) has occurred. The signals may include hybrid automatic repeat requests (HARQ) feedback. The processing circuitry is further configured to receive, from a controlling entity, configuration information related to SL-radio link monitoring (RLM); and configure, according to the configuration information, lower layers of a protocol stack for the RLM. The apparatus may be any type of electronic device, such as user equipment.

The configuration information may include a condition for declaring SL-RLF.

The processing circuitry may be further configured to determine whether the measurements satisfy the condition, and declare that the SL-RLF has occurred when the condition is satisfied.

The processing circuitry may be further configured to determine whether the measurements satisfy the condition, and declare that the SL-RLF has not occurred when the condition is not satisfied.

The processing circuitry may be further configured to perform radio resource control (RRC).

The measurements received by the processing circuitry may be toggled by the RRC control. The measurements may be toggled by an availability of transmissions of the SL connection.

The processing circuitry may be further configured to receive indications. The indications may include a keep-alive failure from an upper layer. The indications may include a failure of another radio link of the apparatus. The another radio link may be linked to the SL connection.

The processing circuitry may be further configured to perform an action in response to determining that the SL-RLF has occurred. The action may be to inform the controlling entity of the SL-RLF.

The action may be to inform upper layers of the SL-RLF. The action may release all radio bearers on the SL connection that has failed. The action may further include to remove all SL RRC connection context maintained for the failed SL connection. The action may be to select a resource pool, separate from resources utilized in the SL connection, to handle a new SL connection.

The processing circuitry may be further configured to establish, after performance of the action, the new SL connection utilizing a resource from the resource pool.

The processing circuitry may be further configured to transmit the measurements of the SL-RLM to the controlling entity.

The controlling entity may be configured to determine, according to the measurements of the SL-RLM received from the apparatus, whether a SL radio link failure (RLF) has occurred.

The controlling entity may be configured to perform an action in response to determining that the SL-RLF has occurred. The controlling entity may be configured to inform upper layers of the SL-RLF, release all radio bearers on the SL connection that has failed, remove all SL RRC connection context maintained for the failed SL connection, or select a resource pool, separate from resources utilized in the SL connection, to handle a new SL connection and establish, after the controlling entity performs the action, the new SL connection utilizing a resource from the resource pool.

Another exemplary embodiment of the present disclosure provides a controlling entity configured to monitor a sidelink (SL) connection between a first apparatus and a second apparatus. The controlling entity comprises processing circuitry configured to provide, to the first apparatus, configuration information related to SL-radio link monitoring (RLM), the configuration information instructing the first apparatus to configure lower layers of a protocol stack for the RLM and to receive measurements in the protocol stack to perform SL-RLM. The processing circuitry is further configured to receive, from the first apparatus, the measurements of the SL-RLM; and determine, according to the measurements of the SL-RLM, whether a SL radio link failure (RLF) has occurred in the SL connection between the first apparatus and the second apparatus.

The processing circuitry of the controlling entity may be further configured to perform an action in response to determining that the SL-RLF has occurred. The action may be to inform upper layers of the SL-RLF, release all radio bearers on the SL connection that has failed, remove all SL RRC connection context maintained for the failed SL connection, or select a resource pool, separate from resources utilized in the SL connection, to handle a new SL connection.

The controlling entity may be a gNodeB, another apparatus, or a device such as a vehicle.

Another exemplary embodiment of the present disclosure provides a method for monitoring a sidelink (SL) connection. The method comprises receiving, from a controlling entity, configuration information related to SL-radio link monitoring (RLM); configuring, according to the configuration information, lower layers of a protocol stack for the RLM; and receiving measurements in the protocol stack to perform SL-RLM.

The method may further comprise determining, according to the measurements of the SL-RLM, whether a SL radio link failure (RLF) has occurred.

The method may further comprise performing an action in response to determining that the SL-RLF has occurred. The action may be to inform the controlling entity of the SL-RLF, inform upper layers of the SL-RLF, release all radio bearers on the SL connection that has failed, remove all SL RRC connection context maintained for the failed SL connection, or select a resource pool, separate from resources utilized in the SL connection, to handle a new SL connection.

The method may further comprise establishing, after performance of the action, the new SL connection utilizing a resource from the resource pool.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

Respective features of the present disclosure may be defined by the following numbered paragraphs:

Paragraph 1. An apparatus configured to monitor a sidelink (SL) connection, the apparatus comprising:
processing circuitry configured to
receive signals in a protocol stack to perform SL-radio link monitoring (SL-RLM); and
determine, according to the signals, whether a SL-radio link failure (RLF) has occurred.

Paragraph 2. The apparatus according to paragraph 1, wherein the signals include hybrid automatic repeat request (HARQ) feedback.

Paragraph 3. The apparatus according to paragraph 2, wherein in a case that the signals include a HARQ-NACK, the processing circuitry determines that the SL-RLF has occurred.

Paragraph 4. The apparatus according to paragraph 1, wherein
the processing circuitry is further configured to transmit a signal block to another apparatus, and
the signals are in response to the transmission of the signal block.

Paragraph 5. The apparatus according to paragraph 1, wherein the processing circuitry is further configured to
receive configuration information related to the SL-RLM for the signals, the configuration information including configurations for measurement quantities of the signals and a condition for declaring SL-RLF;
configure, according to the configuration information, lower layers of the protocol stack for the SL-RLM for the signals; and
perform SL-RLM measurements of the measurement quantities.

Paragraph 6: The apparatus according to paragraph 5, wherein the measurement quantities include hybrid automatic repeat request (HARQ) feedback.

Paragraph 7: The apparatus according to paragraph 5, wherein the measurement quantities include radio link in-sync or out-of-sync.

Paragraph 8: The apparatus according to paragraph 5, wherein the measurement quantities include a keep-alive message.

Paragraph 9 : The apparatus according to paragraph 5, wherein the measurement quantities include Radio Link Control (RLC) feedback.

Paragraph 10. The apparatus according to paragraph 5, wherein the processing circuitry is further configured to
determine whether the SL-RLM measurements satisfy the condition, and
declare that the SL-RLF has occurred in a case that the condition is satisfied.

Paragraph 11. The apparatus according to paragraph 5, wherein the processing circuitry is further configured to
determine whether the SL-RLM measurements satisfy the condition, and
declare that the SL-RLF has not occurred in a case that the condition is not satisfied.

Paragraph 12. The apparatus according to paragraph 5, wherein the processing circuitry is further configured to transmit the SL-RLM measurements of the signals to a controlling entity.

Paragraph 13. The apparatus according to paragraph 12, wherein the controlling entity determines, according to the SL-RLM measurements received from the apparatus, whether the SL-RLF has occurred.

Paragraph 14. The apparatus according to paragraph 1, wherein the processing circuitry is further configured to receive an indication, from an upper layer, including a keep-alive failure.

Paragraph 15. A method for monitoring a sidelink (SL) connection, the method comprising:
receiving signals in a protocol stack to perform SL-radio link monitoring (SL-RLM); and
determining, according to the signals, whether a SL-radio link failure (RLF) has occurred.

Paragraph 16. The method according to paragraph 15, wherein the signals include hybrid automatic repeat request (HARQ) feedback.

Paragraph 17. The method according to paragraph 16, wherein in a case that the signals include a HARQ-NACK, the determining indicates that the SL-RLF has occurred.

Paragraph 18. The method according to paragraph 15, further comprising:
transmitting a signal block to another apparatus, wherein
the signals are in response to the transmission of the signal block.

Paragraph 19. The method according to paragraph 15, further comprising:
receiving configuration information related to the SL-RLM for the signals, the configuration information including configurations for measurement quantities of the signals and a condition for declaring SL-RLF;
configuring, according to the configuration information, lower layers of the protocol stack for the SL-RLM for the signals; and
performing SL-RLM measurements of the measurement quantities.

Paragraph 20. The method according to paragraph 19, further comprising:
determining whether the SL-RLM measurements satisfy the condition; and
declaring that the SL-RLF has occurred in a case that the condition is satisfied.

In describing preferred embodiments of the subject matter of the present disclosure, as illustrated in the drawings, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

The following [1]-[10] are incorporated by reference:
[1] 3GPP TS 36.300, (E-UTRAN); Overall description; Stage 2 (Release 15), V15.0.0.
[2] 3GPP TS 36.211, Physical channels and modulation (Release 15).
[3] 3GPP TS 38.300, NR; NR and NG-RAN Overall Description; Stage 2 (Release 15), V15.2.0.
[4] 3GPP TS 38.331, Radio Resource Control (RRC) protocol specification (Release 15), V15.2.1.
[5] 3GPP TS 38.215, NR; Physical layer measurements (Release 15), V15.2.0.
[6] 3GPP TS 38.213, NR; Physical Layer Procedures for Control (Release 15), V15.2.0.
[7] 3GPP TS 38.321, NR; Medium Access Control (MAC) Protocol Specification (Release 15), V15.2.0.
[8] 3GPP TS 38.133, Requirements for support of radio resource management (Release 15), V15.2.0.
[9] 3GPP TS 36.133, Requirements for support of radio resource management (Release 15), V15.2.0.
[10] 3GPP TS 24.334, Proximity-services (ProSe) User Equipment (UE) to ProSe function protocol aspects; Stage (Release 15), V15.2.0.

What is claimed is:

1. A first apparatus comprising:
a processor,
a non-transitory memory, and
communication circuitry, wherein
the first apparatus is operably connected to a second apparatus through one or more radio sidelink via the communication circuitry, and
the non-transitory memory stores instructions, which when executed by the processor, cause the first apparatus to perform:
receiving, from a third apparatus, a plurality of configuration parameters associated with sidelink-radio link monitoring (SL-RLM) between the first apparatus and the second apparatus, the plurality of configuration parameters including a parameter for a hybrid automatic repeat request (HARQ) configuration and a parameter for a radio link control (RLC) configuration;
monitoring one of the one or more radio sidelink between the first apparatus and the second apparatus based on the plurality of configuration parameters;
determining a SL-radio link failure (SL-RLF) between the first apparatus and the second apparatus based on a plurality of triggers for the SL-RLF, the plurality of triggers including a first trigger associated with a HARQ in a media access control (MAC) layer and a second trigger associated with an RLC layer; and
transmitting, to the third apparatus, a message to indicate the SL-RLF, the message including an identity of the second apparatus.

2. The first apparatus of claim 1, wherein the plurality of triggers includes a third trigger associated with a packet data convergence protocol (PDCP) layer and a fourth trigger associated with a radio resource control (RRC) layer.

3. The first apparatus of claim 2, wherein the instructions, which when executed by the processor, cause the first apparatus to perform removing one or more radio bearers associated with the one of the one or more radio sidelink between the first apparatus and the second apparatus based on determining the SL-RLF at the RRC layer.

4. The first apparatus of claim 3, wherein the instructions, which when executed by the processor, cause the first apparatus to perform notifying an upper layer that the SL-RLF has been determined.

5. The first apparatus of claim 1, wherein the first trigger includes one or more of:
a number of missing HARQ feedbacks exceeding a first threshold, and
a number of HARQ-NACKs exceeding a second threshold.

6. A third apparatus comprising:
a processor,
a non-transitory memory, and
communication circuitry, wherein
the non-transitory memory stores instructions, which when executed by the processor, cause the third apparatus to perform:
transmitting, to a first apparatus, a plurality of configuration parameters associated with sidelink-radio link monitoring (SL-RLM) between the first apparatus and a second apparatus, the plurality of configuration parameters including a parameter for a hybrid automatic repeat request (HARQ) configuration and a parameter for a radio link control (RLC) configuration, and the plurality configuration parameters being for monitoring one or more radio sidelinks between the first apparatus and the second apparatus; and receiving, from the first apparatus, a message indicating a SL-radio link failure (SL-RLF) between the first apparatus and the second apparatus, the message including an identity of the second apparatus, and wherein the SL-RLF is determined based on a plurality of triggers for the SL-RLF, the plurality of triggers including a first trigger associated with a HARQ in a media access control (MAC) layer and a second trigger associated with an RLC layer.

7. The third apparatus of claim 6, wherein the plurality of triggers includes a third trigger associated with a packet data convergence protocol (PDCP) layer and a fourth trigger associated with a radio resource control (RRC) layer.

8. The third apparatus of claim 6, wherein the first trigger includes one or more of:
   a number of missing HARQ feedbacks exceeding a first threshold, and
   a number of HARQ-NACKs exceeding a second threshold.

9. A method for wireless communication, the method comprising:
   transmitting, to a first apparatus, a plurality of configuration parameters associated with sidelink-radio link monitoring (SL-RLM) between the first apparatus and a second apparatus, the plurality of configuration parameters including a parameter for a hybrid automatic repeat request (HARQ) configuration and a parameter for a radio link control (RLC) configuration, and the plurality of configuration parameters being for monitoring one or more radio sidelinks between the first apparatus and the second apparatus; and receiving, from the first apparatus, a message indicating a SL-radio link failure (SL-RLF) between the first apparatus and the second apparatus, the message including an identity of the second apparatus, wherein the SL-RLF is determined based on a plurality of triggers for the SL-RLF, the plurality of triggers including a first trigger associated with a HARQ in a media access control (MAC) layer and a second trigger associated with an RLC layer.

10. The method of claim 9, wherein the plurality of triggers includes a third trigger associated with a packet data convergence protocol (PDCP) layer and a fourth trigger associated with a radio resource control (RRC) layer.

11. The method of claim 9, wherein the first trigger includes one or more of:
    a number of missing HARQ feedbacks exceeding a first threshold, and
    a number of HARQ-NACKs exceeding a second threshold.

* * * * *